United States Patent [19]

Hiramatsu

[11] Patent Number: 5,727,035

[45] Date of Patent: Mar. 10, 1998

[54] SYNCHRONIZATION DEVICE FOR DIGITAL COMMUNICATIONS

[75] Inventor: Katsuhiko Hiramatsu, Yokohama, Japan

[73] Assignee: Matsushita Electric Industrial Co., Ltd., Osaka, Japan

[21] Appl. No.: 729,757

[22] Filed: Oct. 7, 1996

[30] Foreign Application Priority Data

Dec. 30, 1995 [JP] Japan ................. 7-353781

[51] Int. Cl.⁶ .................................................. H04L 7/00
[52] U.S. Cl. .......................... 375/368; 375/354; 371/47.1
[58] Field of Search ........................... 375/368, 365, 375/362, 354, 324, 349, 367, 343; 370/514, 509, 515; 371/47.1; 327/141

[56] References Cited

U.S. PATENT DOCUMENTS 4,414,676  11/1983  Kraul et al. ............................. 375/368
4,691,326   9/1987  Tsuchiya ................................. 375/343
5,408,504   4/1995  Ostman .................................... 375/354

FOREIGN PATENT DOCUMENTS 7250120   9/1995  Japan.

Primary Examiner—Stephen Chin
Assistant Examiner—Betsy L. Deppe
Attorney, Agent, or Firm—Pollock, Vande Sande & Priddy

[57] ABSTRACT

A synchronization device has a first section for generating a predetermined signal. A second section is operative for detecting a correlation between a received signal and the predetermined signal generated by the first section. A third section is operative for generating a predetermined correlation reference. A fourth section is operative for calculating an error between the correlation detected by the second section and the predetermined correlation reference generated by the third section. A fifth section is operative for comparing the error calculated by the fourth section with a predetermined threshold value to detect a synchronization timing.

10 Claims, 9 Drawing Sheets

1

SYNCHRONIZATION DEVICE FOR DIGITAL COMMUNICATIONS

BACKGROUND OF THE INVENTION

1. Field of the Invention

This invention relates to a synchronization device for a digital-communication radio receiver.

2. Description of the Prior Art

In typical digital communications by radio, information is transmitted symbol by symbol. For accurate recovery of transmitted information, it is important to provide symbol synchronization between a transmitter and a receiver. Generally, a receiver has a device for automatically synchronizing a symbol timing signal (a symbol clock signal) with a received information signal.

In some of digital-communication radio systems, a transmitter adds a given pattern signal to a head of a transmitted signal. The given pattern signal is used by a receiver to establish symbol synchronization.

A typical synchronization device in a receiver has a correlator subjected to a pair of a reference pattern in-phase signal and a reference pattern quadrature signal, and also a pair of a received in-phase signal and a received quadrature signal. A pair of the reference pattern in-phase signal and the reference pattern quadrature signal corresponds to a given pattern signal generated in a transmitter. The correlator periodically calculates the value of in-phase correlation between a pair of the reference pattern in-phase signal and the reference pattern quadrature signal and a pair of the received in-phase signal and the received quadrature signal. Also, the correlator periodically calculates the value of quadrature correlation between a pair of the reference pattern in-phase signal and the reference pattern quadrature signal and a pair of the received in-phase signal and the received quadrature signal. Furthermore, the correlator periodically calculates the power of the in-phase correlation value and the quadrature correlation value. The typical synchronization device has a section for comparing every calculated power with a threshold power. A phase of a symbol timing signal (a symbol clock signal) is controlled or determined in response to a moment at which the calculated power increases above the threshold power.

Japanese published unexamined patent application 7-250120 discloses a synchronization circuit including a correlator subjected to a unique-word signal and a received signal. The correlator periodically calculates the absolute value of correlation between the unique-word signal and the received signal. A buffer memory is loaded with a plurality of the calculated correlation values. In the synchronization circuit of Japanese application 7-250120, a peak detector selects the first greatest correlation value out of the calculated correlation values in the buffer memory. The peak detector also decides a time position corresponding to the first greatest correlation value. The synchronization circuit in Japanese application 7-250120 includes a judgment section which searches the buffer memory for the second greatest correlation value. If the second greatest correlation value exceeds a threshold value equal to the first greatest correlation value multiplied by a given proportion factor and the time position corresponding to the second greatest correlation value precedes the time position of the first greatest correlation value, the time position of the second greatest correlation value is used as a synchronization timing. Otherwise, the time position of the first greatest correlation value is used as the synchronization timing.

SUMMARY OF THE INVENTION

It is an object of this invention to provide an improved synchronization device.

2

A first aspect of this invention provides a synchronization device comprising first means for generating a predetermined signal; second means for detecting a correlation between a received signal and the predetermined signal generated by the first means; third means for generating a predetermined correlation reference; fourth means for calculating an error between the correlation detected by the second means and the predetermined correlation reference generated by the third means; and fifth means for comparing the error calculated by the fourth means with a predetermined threshold value to detect a synchronization timing.

A second aspect of this invention provides a synchronization device comprising first means for generating a predetermined signal; second means for detecting a correlation between a received signal and the predetermined signal generated by the first means; third means for generating a predetermined correlation reference for a given number of successive samples, the given number being equal to at least three; fourth means for calculating an error between the correlation detected by the second means and the predetermined correlation reference generated by the third means for the given number of successive samples; and fifth means for comparing the error calculated by the fourth means with a predetermined threshold value to detect a synchronization timing.

A third aspect of this invention is based on the second aspect thereof, and provides a synchronization device wherein the error calculated by the fourth means is denoted by "e(t)", and the fourth means calculates the error "e(t)" according to an equation as follows:

$$e(t) = \sum_{n=0}^{N-1} \{x(t+nT) - y(n)\}^2$$

where "n" denotes an integer corresponding to each of "N" successive samples; "t" denotes a time point; "N" denotes the given number; "T" denotes a 1-sample time interval; "x(t+nT)" denotes the correlation detected by the second means; and "y(n)" denotes the predetermined correlation reference.

A fourth aspect of this invention is based on the third aspect thereof, and provides a synchronization device wherein the fourth means comprises first, second, and third delay elements each for providing a 1-sample delay, the first delay element receiving an output signal of the second means which represents the detected correlation, the first delay element being successively followed by the second and third delay elements; a first subtracter calculating a first difference between an output signal of the first delay element and the predetermined correlation reference "y(0)"; a second subtracter calculating a second difference between an output signal of the second delay element and the predetermined correlation reference "y(1)"; a third subtracter calculating a third difference between an output signal of the third delay element and the predetermined correlation reference "y(2)"; a first calculator calculating a square of the first difference calculated by the first subtracter; a second calculator calculating a square of the second difference calculated by the second subtracter; a third calculator calculating a square of the third difference calculated by the third subtracter; and an adder adding the square calculated by the first calculator, the square calculated by the second calculator, and the square calculated by the third calculator into the error "e(t)".

A fifth aspect of this invention is based on the third aspect thereof, and provides a synchronization device wherein the fourth means comprises first, second, and third delay elements each for providing a 1-sample delay, the first delay element receiving an output signal of the second means which represents the detected correlation, the first delay element being successively followed by the second and third delay elements; a first multiplier multiplying an output signal of the first delay element and the predetermined correlation reference "y(0)"; a second multiplier multiplying an output signal of the second delay element and the predetermined correlation reference "y(1)"; a third multiplier multiplying an output signal of the third delay element and the predetermined correlation reference "y(2)"; a first adder adding output signals of the first, second, and third multipliers; a first calculator doubles an output signal of the first adder; a second calculator squaring the output signal of the first delay element; fourth, fifth, and sixth delay elements each for providing a 1-sample delay, the fourth delay element receiving an output signal of the second calculator, the fourth delay element being successively followed by the fifth and sixth delay elements; a second adder adding output signals of the fourth, fifth, and sixth delay elements; and a third calculator subtracting an output signal of the first calculator from an output signal of the second adder, and adding a result of said subtracting and a sum of a square of the predetermined correlation reference "y(0)", a square of the predetermined correlation reference "y(1)", and a square of the predetermined correlation reference "y(2)" to calculate the error "e(t)".

A sixth aspect of this invention is based on the third aspect thereof, and provides a synchronization device wherein the fourth means comprises first, second, and third delay elements each for providing a 1-sample delay, the first delay element receiving an output signal of the second means which represents the detected correlation, the first delay element being successively followed by the second and third delay elements; a first multiplier multiplying an output signal of the first delay element and the predetermined correlation reference "y(0)"; a second multiplier multiplying an output signal of the second delay element and the predetermined correlation reference "y(1)"; a third multiplier multiplying an output signal of the third delay element and the predetermined correlation reference "y(2)"; an adder adding output signals of the first, second, and third multipliers; a first calculator doubles an output signal of the adder; a second calculator squaring the output signal of the first delay element; fourth, fifth, sixth, and seventh delay elements each for providing a 1-sample delay, the fourth delay element receiving an output signal of the second calculator, the fourth delay element being successively followed by the fifth, sixth, and seventh delay elements; an eighth delay element for proving a 1-sample delay; a third calculator subtracting an output signal of the seventh delay element from an output signal of the fourth delay element, and adding a result of said subtracting and an output signal of the eighth delay element, an output signal of the third calculator being fed to the eighth delay element; and a fourth calculator subtracting an output signal of the first calculator from the output signal of the third calculator, and adding a result of said subtracting and a sum of a square of the predetermined correlation reference "y(0)", a square of the predetermined correlation reference "y(1)", and a square of the predetermined correlation reference "y(2)" to calculate the error "e(t)".

A seventh aspect of this invention provides a synchronization device comprising first means for generating a predetermined signal; second means for detecting a correlation between a received signal and the predetermined signal generated by the first means; third means for generating a predetermined correlation reference; fourth means for determining a corrective factor in response to the correlation detected by the second means and the predetermined correlation reference generated by the third means; fifth means for correcting the predetermined correlation reference generated by the third means into a second correlation reference in response to the corrective factor determined by the fourth means; sixth means for calculating an error between the correlation detected by the second means and the second correlation reference generated by the fifth means; and seventh means for comparing the error calculated by the sixth means with a predetermined threshold value to detect a synchronization timing.

An eighth aspect of this invention provides a synchronization device comprising first means for generating a predetermined signal; second means for detecting a correlation between a received signal and the predetermined signal generated by the first means; third means for generating a predetermined correlation reference for a given number of successive samples, the given number being equal to at least three; fourth means for determining a corrective factor in response to the correlation detected by the second means and the predetermined correlation reference generated by the third means; fifth means for correcting the predetermined correlation reference generated by the third means into a second correlation reference in response to the corrective factor determined by the fourth means; sixth means for calculating an error between the correlation detected by the second means and the second correlation reference generated by the fifth means for the given number of successive samples; and seventh means for comparing the error calculated by the sixth means with a predetermined threshold value to detect a synchronization timing.

A ninth aspect of this invention is based on the eighth aspect thereof, and provides a synchronization device wherein the error calculated by the sixth means is denoted by "e(t)", and the sixth means calculates the error "e(t)" according to equations as follows:

$$e(t) = \sum_{n=0}^{N-1} \{x(t+nT) - ay(n)\}^2$$

$$a = \left[ \sum_{n=0}^{N-1} x(t+nT)y(n) \right] / \left[ \sum_{n=0}^{N-1} y(n)^2 \right]$$

where "n" denotes an integer corresponding to each of "N" successive samples; "t" denotes a time point; "N" denotes the given number; "T" denotes a 1-sample time interval; "x(t+nT)" denotes the correlation detected by the second means; "y(n)" denotes the predetermined correlation reference; and "a" denotes the corrective factor determined by the fourth means.

A tenth aspect of this invention is based on the ninth aspect thereof, and provides a synchronization device wherein the fourth means, the fifth means, and the sixth means comprise first, second, and third delay elements each for providing a 1-sample delay, the first delay element receiving an output signal of the second means which represents the detected correlation, the first delay clement being successively followed by the second and third delay elements; a first multiplier multiplying an output signal of the first delay element and the predetermined correlation reference "y(0)"; a second multiplier multiplying an output signal of the second delay element and the predetermined correlation reference "y(1)"; a third multiplier multiplying an output signal of the third delay element and the predetermined correlation reference "y(2)"; a first adder adding output signals of the first, second, and third multipliers; a fourth multiplier multiplying an output signal of the first adder and a reciprocal of a sum of a square of the predetermined correlation reference "y(0)", a square of the predetermined correlation reference "y(1)", and a square of the predetermined correlation reference "y(2)"; a fifth multiplier multiplying the predetermined correlation reference "y(0)" and an output signal of the fourth multiplier; a sixth multiplier multiplying the predetermined correlation reference "y(1)" and the output signal of the fourth multiplier; a seventh multiplier multiplying the predetermined correlation reference "y(2)" and the output signal of the fourth multiplier; a first subtracter calculating a first difference between the output signal of the first delay element and an output signal of the fifth multiplier; a second subtracter calculating a second difference between the output signal of the second delay element and an output signal of the sixth multiplier; a third subtracter calculating a third difference between the output signal of the third delay element and an output signal of the seventh multiplier; a first calculator calculating a square of the first difference calculated by the first subtracter; a second calculator calculating a square of the second difference calculated by the second subtracter; a third calculator calculating a square of the third difference calculated by the third subtracter; and a second adder adding the square calculated by the first calculator, the square calculated by the second calculator, and the square calculated by the third calculator into the error "e(t)".

An eleventh aspect of this invention is based on the ninth aspect thereof, and provides a synchronization device wherein the fourth means, the fifth means, and the sixth means comprise first, second, and third delay elements each for providing a 1-sample delay, the first delay element receiving an output signal of the second means which represents the detected correlation, the first delay element being successively followed by the second and third delay elements; a first multiplier multiplying an output signal of the first delay element and the predetermined correlation reference "y(0)"; a second multiplier multiplying an output signal of the second delay element and the predetermined correlation reference "y(1)"; a third multiplier multiplying an output signal of the third delay element and the predetermined correlation reference "y(2)"; a first adder adding output signals of the first, second, and third multipliers; a first calculator squaring an output signal of the first adder; a fourth multiplier multiplying an output signal of the first calculator and a reciprocal of a sum of a square of the predetermined correlation reference "y(0)", a square of the predetermined correlation reference "y(1)", and a square of the predetermined correlation reference "y(2)"; a second calculator squaring the output signal of the first delay element; fourth, fifth, sixth, and seventh delay elements each for providing a 1-sample delay, the fourth delay element receiving an output signal of the second calculator, the fourth delay element being successively followed by the fifth, sixth, and seventh delay elements; a second adder adding output signals of the fourth, fifth, and sixth delay elements; and a subtracter calculating a difference between an output signal of the fourth multiplier and an output signal of the second adder to calculate the error "e(t)".

A twelfth aspect of this invention is based on the ninth aspect thereof, and provides a synchronization device wherein the fourth means, the fifth means, and the sixth means comprise first, second, and third delay elements each for providing a 1-sample delay, the first delay element receiving an output signal of the second means which represents the detected correlation, the first delay element being successively followed by the second and third delay elements; a first multiplier multiplying an output signal of the first delay element and the predetermined correlation reference "y(0)"; a second multiplier multiplying an output signal of the second delay element and the predetermined correlation reference "y(1)"; a third multiplier multiplying an output signal of the third delay element and the predetermined correlation reference "y(2)"; a first adder adding output signals of the first, second, and third multipliers; a first calculator squaring an output signal of the first adder; a second calculator squaring the output signal of the first delay element; fourth, fifth, and sixth delay elements each for providing a 1-sample delay, the fourth delay element receiving an output signal of the second calculator, the fourth delay element being successively followed by the fifth and sixth delay elements; a second adder adding output signals of the fourth, fifth, and sixth delay elements; and a subtracter calculating a difference between an output signal of the first calculator and an output signal of the second adder to calculate the error "e(t)".

A thirteenth aspect of this invention is based on the ninth aspect thereof, and provides a synchronization device wherein the fourth means, the fifth means, and the sixth means comprise first, second, and third delay elements each for providing a 1-sample delay, the first delay element receiving an output signal of the second means which represents the detected correlation, the first delay element being successively followed by the second and third delay elements; a first multiplier multiplying an output signal of the first delay element and the predetermined correlation reference "y(0)"; a second multiplier multiplying an output signal of the second delay element and the predetermined correlation reference "y(1)"; a third multiplier multiplying an output signal of the third delay element and the predetermined correlation reference "y(2)"; an adder adding output signals of the first, second, and third multipliers; a first calculator squaring an output signal of the adder; a fourth multiplier multiplying an output signal of the first calculator and a reciprocal of a sum of a square of the predetermined correlation reference "y(0)", a square of the predetermined correlation reference "y(1)", and a square of the predetermined correlation reference "y(2)"; a second calculator squaring the output signal of the first delay element; fourth, fifth, sixth, and seventh delay elements each for providing a 1-sample delay, the fourth delay element receiving an output signal of the second calculator, the fourth delay element being successively followed by the fifth, sixth, and seventh delay elements; an eighth delay element for proving a 1-sample delay; a third calculator subtracting an output signal of the seventh delay element from an output signal of the fourth delay element, and adding a result of said subtracting and an output signal of the eighth delay element, an output signal of the third calculator being fed to the eighth delay element; and a subtracter calculating a difference between an output signal of the fourth multiplier and the output signal of the third calculator to calculate the error "e(t)".

A fourteenth aspect of this invention is based on the ninth aspect thereof, and provides a synchronization device wherein the fourth means, the fifth means, and the sixth means comprise first, second, and third delay elements each for providing a 1-sample delay, the first delay element receiving an output signal of the second means which represents the detected correlation, the first delay element being successively followed by the second and third delay elements; a first multiplier multiplying an output signal of the first delay element and the predetermined correlation reference "y(0)"; a second multiplier multiplying an output signal of the second delay element and the predetermined correlation reference "y(1)"; a third multiplier multiplying an output signal of the third delay element and the predetermined correlation reference "y(2)"; an adder adding output signals of the first, second, and third multipliers; a first calculator squaring an output signal of the adder; a second calculator squaring the output signal of the first delay element; fourth, fifth, sixth, and seventh delay elements each for providing a 1-sample delay, the fourth delay element receiving an output signal of the second calculator, the fourth delay element being successively followed by the fifth, sixth, and seventh delay elements; an eighth delay element for proving a 1-sample delay; a third calculator subtracting an output signal of the seventh delay element from an output signal of the fourth delay element, and adding a result of said subtracting and an output signal of the eighth delay element, an output signal of the third calculator being fed to the eighth delay element; and a subtracter calculating a difference between an output signal of the first calculator and the output signal of the third calculator to calculate the error "e(t)".

DESCRIPTION OF THE PREFERRED EMBODIMENTS

First Embodiment

Figure 1:
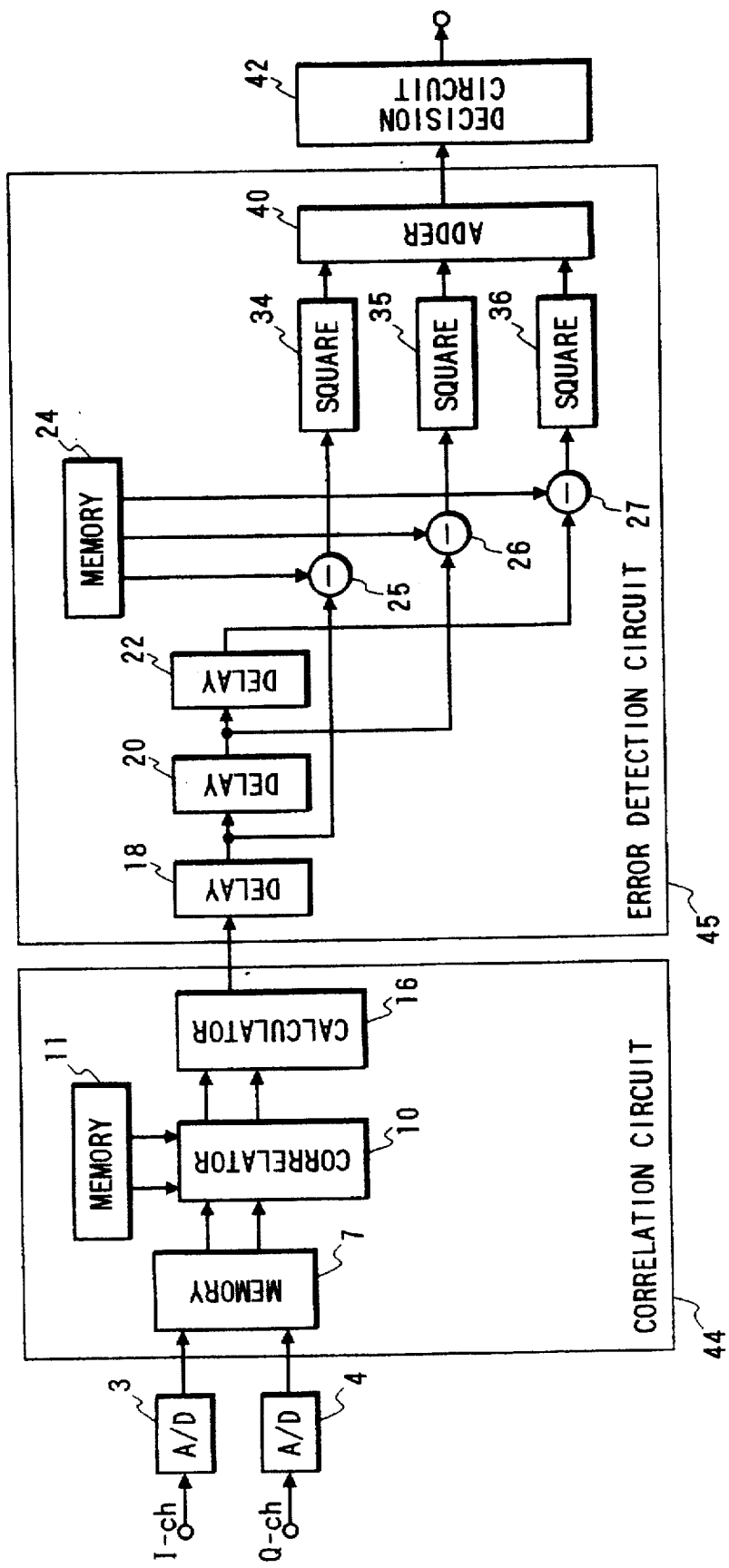
FIG. 1 is a block diagram of a synchronization device according to a first embodiment of this invention.

With reference to FIG. 1, a pair of a received in-phase signal (a received I-channel signal) and a received quadrature signal (a received Q-channel signal) are fed to analog-to-digital converters 3 and 4 respectively. Generally, the received in-phase signal and the received quadrature signal are derived from a received radio signal by a demodulator (not shown). The analog-to-digital converters 3 and 4 are referred to as the A/D converters 3 and 4. The received in-phase signal is changed by the A/D converter 3 into a digital received in-phase signal. The received quadrature signal is changed by the A/D converter 4 into a digital received quadrature signal.

A correlation circuit 44 follows the A/D converters 3 and 4. The correlation circuit 44 includes a memory 7, a correlator 10, a memory 11, and a calculator 16. The input side of the memory 7 follows the A/D converters 3 and 4. The output side of the memory 7 is connected to a first input side of the correlator 10. The memory 11 is connected to a second input side of the correlator 10. The output side of the correlator 10 is connected to the input side of the calculator 16.

A pair of the digital received in-phase signal and the digital received quadrature signal are written into the memory 7 from the A/D converters 3 and 4 sample by sample. Here, "sample" corresponds in time interval to "symbol" divided by a given natural number, for example, 2, 4, or 8. For each of the digital received in-phase signal and the digital received quadrature signal, the memory 7 has a capacity corresponding to a given number "M" of samples. Accordingly, "M" successive samples of each of the digital received in-phase signal and the digital received quadrature signal are stored in the memory 7. The given number "M" of samples corresponds to one symbol. Each time a pair of new samples of the digital received in-phase signal and the digital received quadrature signal is written into the memory 7, a pair of the oldest samples thereof is erased from the memory 7. The memory 7 serves as a shift register.

The memory 11 stores a pair of a reference in-phase signal and a reference quadrature signal corresponding to one symbol. A pair of the reference in-phase signal and the reference quadrature signal in the memory 11 represents a given symbol (a symbol in a given state). Each of the reference in-phase signal and the reference quadrature signal in the memory 11 is divided into "M" 1-sample corresponding segments.

The correlator 10 implements a sequence of the following processes for every sample interval. The correlator 10 reads out "M" samples of each of the digital received in-phase signal and the digital received quadrature signal from the memory 7. The correlator 10 reads out "M" 1-sample corresponding segments of each of the reference in-phase signal and the reference quadrature signal from the memory 11. The correlator 10 calculates the value "comb$_I$" of in-phase correlation between a pair of the received in-phase signal and the received quadrature signal and a pair of the reference in-phase signal and the reference quadrature signal according to an equation as follows.

$$comb_I = Re\left[ \sum_{i=1}^{M} sw(i) \times r(i)^* \right] \quad (1)$$

$$= \sum_{i=1}^{M} \{sw_I(i) \times r_I(i) + sw_Q(i) \times r_Q(i)\}$$

where "r(i)*" denotes a conjugate complex number with respect to the complex number "r(i)"; "sw(i)" denotes a sample of a pair of the received in-phase signal and the received quadrature signal; "r(i)" denotes a 1-sample corresponding segment of a pair of the reference in-phase signal and the reference quadrature signal; "sw$_I$(i)" denotes a sample of the received in-phase signal; "sw$_Q$(i)" denotes a sample of the received quadrature signal; "r$_I$(i)" denotes a 1-sample corresponding segment of the reference in-phase signal; and "r$_Q$(i)" denotes a 1-sample corresponding segment of the reference quadrature signal. The correlator 10 calculates the value "comb$_Q$" of quadrature correlation between a pair of the received in-phase signal and the received quadrature signal and a pair of the reference in-phase signal and the reference quadrature signal according to an equation as follows.

$$comb_Q = Im\left[\sum_{i=1}^{M} sw(i) \times r(i)^*\right] \quad (2)$$

$$= \sum_{i=1}^{M} \{sw_Q(i) \times r_I(i) - sw_I(i) \times r_Q(i)\}$$

The calculator 16 is informed of the in-phase correlation value "$comb_I$" and the quadrature correlation value "$comb_Q$" by the correlator 10. For every sample interval, the calculator 16 computes the power "comb" of the in-phase correlation value "$comb_I$" and the quadrature correlation value "$comb_Q$" by referring to the following equation.

$$comb = comb_I^2 + comb_Q^2 \quad (3)$$

The calculator 16 outputs a data piece representing the computed correlation power "comb".

An error detection circuit 45 follows the correlation circuit 44. The error detection circuit 45 includes delay elements or D-type flip-flops 18, 20, and 22, a memory 24, subtracters 25, 26, and 27, calculators 34, 35, and 36, and an adder 40. The input side of the delay element 18 is connected to the output side of the calculator 16 in the correlation circuit 44. The output side of the delay element 18 is connected to the input side of the delay element 20. The output side of the delay element 18 is also connected to a first input side of the subtracter 25. The output side of the delay element 20 is connected to the input side of the delay element 22. The output side of the delay element 20 is also connected to a first input side of the subtracter 26. The output side of the delay element 22 is connected to a first input side of the subtracter 27. Second input sides of the subtracters 25, 26, and 27 are connected to the memory 24. The output side of the subtracter 25 is connected to the input side of the calculator 34. The output side of the calculator 34 is connected to a first input side of the adder 40. The output side of the subtracter 26 is connected to the input side of the calculator 35. The is connected f the calculator 35 is connected to a second input side of the adder 40. The output side of the subtracter 27 is connected to the input side of the calculator 36. The output side of the calculator 36 is connected to a third input side of the adder 40.

The delay elements 18, 20, and 22 compose a 3-stage shift register into which the output data from the calculator 16 in the correlation circuit 44 is stored sample by sample. The output data from the calculator 16 is propagated through the 3-stage shift register while receiving a 1-sample delay by each of the delay elements 18, 20, and 22. The data outputted from the delay element 18 precedes the output data from the calculator 16 by a 1-sample time interval. The data outputted from the delay element 20 precedes the output data from the delay element 18 by a 1-sample time interval. Accordingly, the output data from the delay element 20 represents a computed correlation power corresponding to a sample immediately preceding a sample related to a computed correlation power represented by the output data from the delay element 18. The data outputted from the delay element 22 precedes the data outputted from the delay element 18 by a 2-sample time interval. Accordingly, the output data from the delay element 22 represents a computed correlation power corresponding to a second immediately preceding sample with respect to a sample related to a computed correlation power represented by the output data from the delay element 18.

The memory 24 stores reference signals representing reference correlation powers for three successive samples (former, mid, and later samples). The reference correlation powers are predetermined to agree with computed correlation powers available in given good receiving conditions or given ideal receiving conditions.

The subtracter 25 receives the output data from the delay element 18. The subtracter 25 receives the reference signal from the memory 24 which represents the later-sample reference correlation power. The subtracter 25 calculates the difference (the error) between the computed correlation power represented by the output data from the delay element 18 and the later-sample reference correlation power. The subtracter 25 informs the calculator 34 of the calculated later-sample difference (the calculated later-sample error). The calculator 34 computes the square of the later-sample difference (the later-sample error).

The subtracter 26 receives the output data from the delay element 20. The subtracter 26 receives the reference signal from the memory 24 which represents the mid-sample reference correlation power. The subtracter 26 calculates the difference (the error) between the computed correlation power represented by the output data from the delay element 20 and the mid-sample reference correlation power. The subtracter 26 informs the calculator 35 of the calculated mid-sample difference (the calculated mid-sample error). The calculator 35 computes the square of the mid-sample difference (the mid-sample error).

The subtracter 27 receives the output data from the delay element 22. The subtracter 27 receives the reference signal from the memory which represents the former-sample reference correlation power. The subtracter 27 calculates the difference (the error) between the computed correlation power represented by the output data from the delay element 22 and the former-sample reference correlation power. The subtracter 27 informs the calculator 36 of the calculated former-sample difference (the calculated former-sample error). The calculator 36 computes the square of the former-sample difference (the former-sample error).

The adder 40 is informed of the square of the later-sample difference (the later-sample error), the square of the mid-sample difference (the mid-sample error), and the square of the former-sample difference (the former-sample error) by the calculators 34, 35, and 36. For every sample interval, the adder 40 calculates the sum of the square of the later-sample difference (the later-sample error), the square of the mid-sample difference (the mid-sample error), and the square of the former-sample difference (the former-sample error). The calculated sum corresponds to a synthetic error between the calculated correlation powers and the reference correlation powers for the three successive samples (the former, mid, and later samples). For every sample interval, the adder 40 generates and outputs a data piece representing the synthetic error.

The delay elements 18, 20, and 22, the memory 24, the subtracters 25, 26, and 27, the calculators 34, 35, and 36, and the adder 40 in the error detection circuit 45 cooperate to calculate the synthetic error "e(t)" according to the following equation.

$$e(t) = \sum_{n=0}^{2} \{x(t+nT) - y(n)\}^2 \quad (4)$$

where "n" denotes an integer corresponding to each of three successive samples; "t" denotes a time point; "T" denotes a 1-sample time interval; "x(t+nT)" denotes the calculated correlation powers for three successive samples; and "y(n)" denotes the reference correlation powers for three successive samples.

A decision circuit 42 follows the error detection circuit 45. The input side of the decision circuit 42 is connected to the output side of the adder 40 in the error detection circuit 45.

For every sample interval, the decision circuit 42 receives the output data piece from the adder 40 which represents the synthetic error. The decision circuit 42 includes a comparator. For every sample interval, the comparator in the decision circuit 42 determines whether or not the synthetic error is greater than a predetermined threshold value. When the synthetic error is equal to or smaller than the threshold value, the decision circuit 42 outputs a signal of "1" as an indication of agreement between a symbol represented by a pair of the received in-phase signal and the received quadrature signal and the given symbol represented by a pair of the reference in-phase signal and the reference quadrature signal. On the other hand, when the synthetic error is greater than the threshold value, the decision circuit 42 outputs a signal of "0" as an indication of disagreement between a symbol represented by a pair of the received in-phase signal and the received quadrature signal and the given symbol represented by a pair of the reference in-phase signal and the reference quadrature signal.

The output signal of the decision circuit 42 is fed to a signal generator (not shown) for producing a symbol clock signal (a symbol timing signal). The signal generator controls the phase of the produced symbol clock signal in response to the output signal of the decision circuit 42 to synchronize the symbol clock signal with the received signal.

Under some conditions, a radio signal from a transmitter is propagated to a receiver via a plurality of paths having different lengths respectively. A shorter path causes a preceding wave component of the radio signal while a longer path causes a delayed wave component thereof. Generally, the shorter path agrees with a direct path, and the preceding wave component of the radio signal is a direct wave component thereof. The preceding wave component (the direct wave component) of the radio signal reaches the receiver before the delayed wave component thereof reaches the receiver. Usually, during the propagation along the longer path, the radio signal is reflected by a building, a mountain, or the like.

Figure 2:
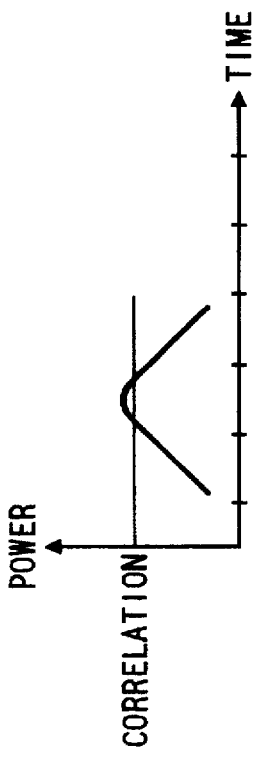
FIG. 2 is a diagram of a first example of a time-domain variation in a calculated correlation power.
Figure 4:
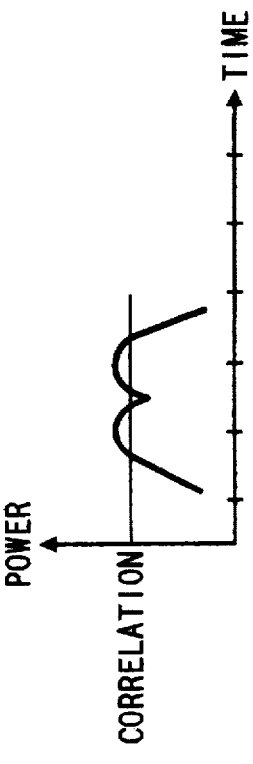
FIG. 4 is a diagram of a third example of a time-domain variation in a calculated correlation power.
Figure 3:
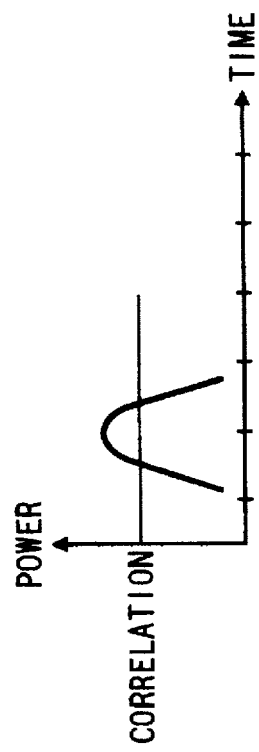
FIG. 3 is a diagram of a second example of a time-domain variation in a calculated correlation power.
Figure 5:
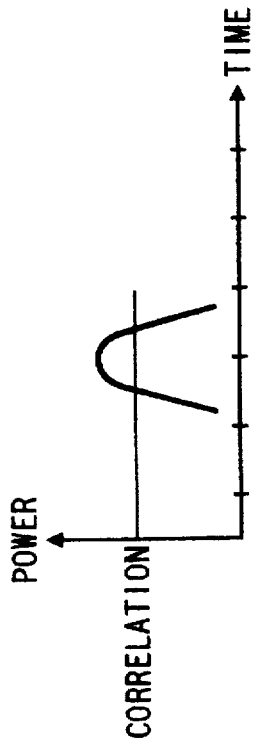
FIG. 5 is a diagram of a fourth example of a time-domain variation in a calculated correlation power.

It is now assumed that a radio signal from a transmitter contains a symbol equal to the given symbol represented by a pair of the reference in-phase signal and the reference quadrature signal in the memory 11. In the case where a preceding wave component of the radio signal is dominant, the correlation power computed by the calculator 16 varies in time domain as shown in FIG. 2. In the case where a delayed wave component of the radio signal is dominant, the correlation power computed by the calculator 16 varies in time domain as shown in FIG. 3. In the case where the preceding wave component and the delayed wave component of the radio signal have substantially equal strengths and opposite phases, the correlation power computed by the calculator 16 varies in time domain as shown in FIG. 4. In this case, the time point of the occurrence of the peak of the computed correlation power differs from both the correct time points determined by the preceding wave component and the delayed wave component of the radio signal. In the case where the preceding wave component and the delayed wave component of the radio signal have substantially equal strengths and common phases, the correlation power computed by the calculator 16 varies in time domain as shown in FIG. 5. In this case, the computed correlation power peaks twice during a given time interval.

The threshold value used for the synthetic error judgment by the decision circuit 42 is chosen so that the decision circuit 42 will output a signal of "1" under the conditions in FIGS. 2 and 3 while the decision circuit 42 will continue to output a signal of "0" under the conditions in FIGS. 4 and 5. In other words, the decision circuit 42 responds to the conditions in FIGS. 2 and 3 but does not respond to the conditions in FIGS. 4 and 5. This is advantageous in maintaining the accuracy of control of the phase of the symbol clock signal since the conditions in FIGS. 4 and 5 have wrong information of a symbol timing.

It should be noted that the calculators 34, 35, and 36 may be modified to compute the absolute values of the later-sample difference (the later-sample error), the mid-sample difference (the mid-sample error), and the former-sample difference (the former-sample error) rather than the squares thereof. In this case, the adder 40 calculates the synthetic error from the sum of the absolute values rather than the squares.

Furthermore, it should be noted that the error detection circuit 45 may be modified into a version having four or more stages. In this case, the error detection circuit 45 calculates the synthetic error "e(t)" according to the following equation.

$$e(t) = \sum_{n=0}^{N-1} \{x(t+nT) - y(n)\}^2 \qquad (5)$$

where "n" denotes an integer corresponding to each of "N" successive samples; "t" denotes a time point; "N" denotes a given natural number corresponding to the number of stages which is equal to or greater than four; "T" denotes a 1-sample time interval; "x(t+nT)" denotes the calculated correlation powers for "N" successive samples; and "y(n)" denotes the reference correlation powers for "N" successive samples.

Second Embodiment

A second embodiment of this invention is similar to the embodiment of FIG. 1 except that a decision circuit 42A and an error detection circuit 45A replace the decision circuit 42 and the error detection circuit 45 in FIG. 1.

Figure 6:
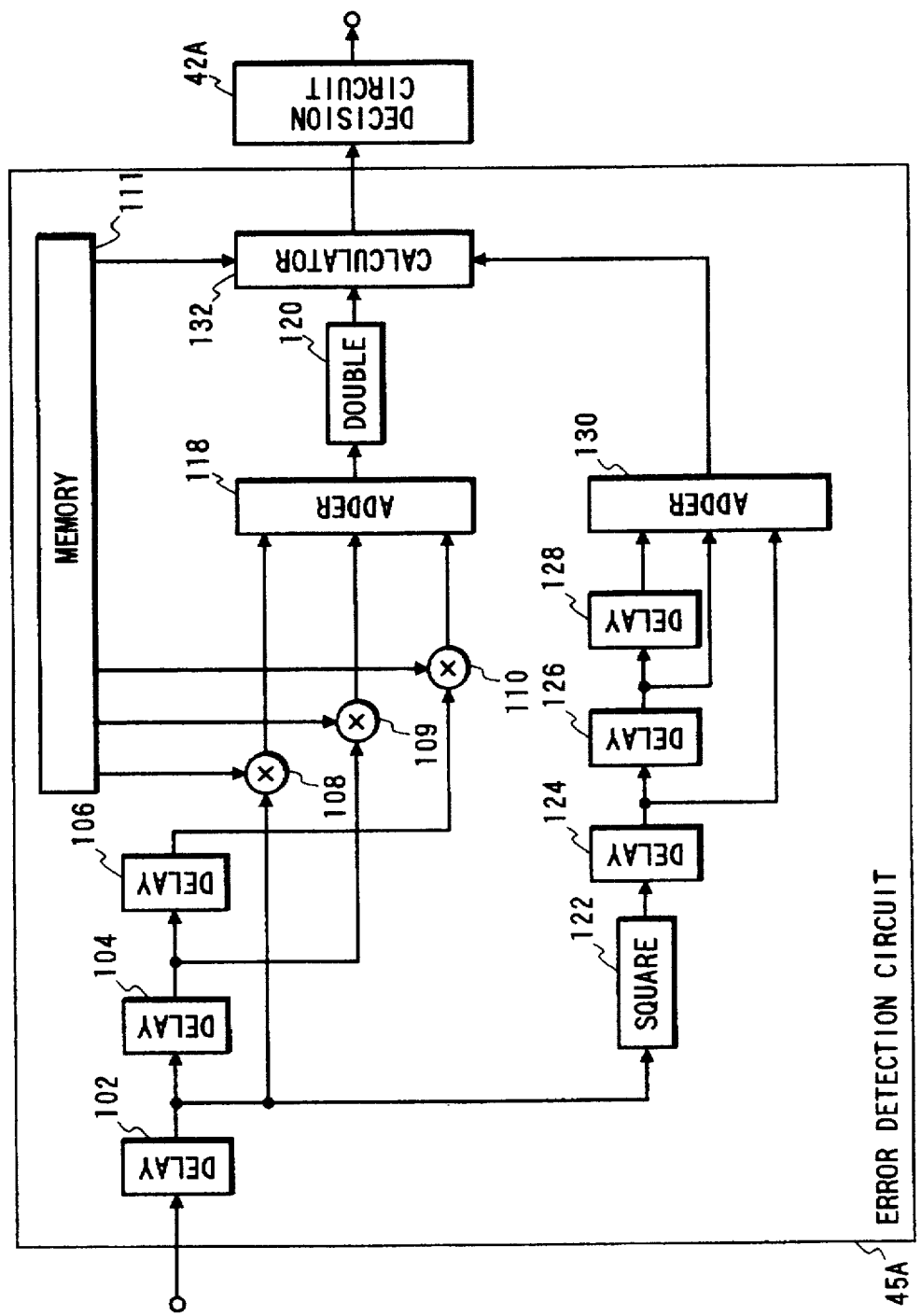
FIG. 6 is a block diagram of a part of a synchronization device according to a second embodiment of this invention.

As shown in FIG. 6, the error detection circuit 45A includes delay elements or D-type flip-flops 102, 104, and 106, multipliers 108, 109, and 110, a memory 111, an adder 118, calculators 120 and 122, delay elements or D-type flip-flops 124, 126, and 128, an adder 130, and a calculator 132.

The input side of the delay element 102 is connected to the output side of the calculator 16 in the correlation circuit 44 (see FIG. 1). The output side of the delay element 102 is connected to the input side of the delay element 104. The output side of the delay element 102 is also connected to a first input side of the multiplier 108. Furthermore, the output side of the delay element 102 is connected to the input side of the calculator 122. The output side of the delay element 104 is connected to the input side of the delay element 106. The output side of the delay element 104 is also connected to a first input side of the multiplier 109. The output side of the delay element 106 is connected to a first input side of the multiplier 110. Second input sides of the multipliers 108, 109, and 110 are connected to the memory 111. The output side of the multiplier 108 is connected to a first input side of the adder 118. The output side of the multiplier 109 is connected to a second input side of the adder 118. The output side of the multiplier 110 is connected to a third input side of the adder 118. The output side of the adder 118 is connected to the input side of the calculator 120. The output side of the calculator 120 is connected to a first input side of the calculator 132. A second input side of the calculator 132 is connected to the memory 111.

The output side of the calculator 122 is connected to the input side of the delay element 124. The output side of the delay element 124 is connected to the input side of the delay element 126. The output side of the delay element 124 is also connected to a first input side of the adder 130. The output side of the delay element 126 is connected to the input side of the delay element 128. The output side of the delay element 126 is also connected to a second input side of the adder 130. The output side of the delay element 128 is connected to a third input side of the adder 130. The output side of the adder 130 is connected to a third input side of the calculator 132. The output side of the calculator 132 is followed by the decision circuit 42A.

The delay elements 102, 104, and 106 compose a 3-stage shift register into which the output data from the calculator 16 in the correlation circuit 44 (see FIG. 1) is stored sample by sample. The output data from the calculator 16 is propagated through the 3-stage shift register while receiving a 1-sample delay by each of the delay elements 102, 104, and 106. The data outputted from the delay element 102 precedes the output data from the calculator 16 by a 1-sample time interval. The data outputted from the delay element 104 precedes the output data from the delay element 102 by a 1-sample time interval. Accordingly, the output data from the delay element 104 represents a computed correlation power corresponding to a sample immediately preceding a sample related to a computed correlation power represented by the output data from the delay element 102. The data outputted from the delay element 106 precedes the data outputted from the delay element 102 by a 2-sample time interval. Accordingly, the output data from the delay element 106 represents a computed correlation power corresponding to a second immediately preceding sample with respect to a sample related to a computed correlation power represented by the output data from the delay element 102.

The memory 111 stores reference signals representing reference correlation powers for three successive samples (former, mid, and later samples). The reference correlation powers are predetermined to agree with computed correlation powers available in given good receiving conditions or given ideal receiving conditions.

The multiplier 108 receives the output data from the delay element 102. The multiplier 108 receives the reference signal from the memory 111 which represents the later-sample reference correlation power. The multiplier 108 calculates the product (the multiplication) between the computed correlation power represented by the output data from the delay element 102 and the later-sample reference correlation power. The multiplier 108 informs the adder 118 of the calculated later-sample product.

The multiplier 109 receives the output data from the delay element 104. The multiplier 109 receives the reference signal from the memory 111 which represents the mid-sample reference correlation power. The multiplier 109 calculates the product (the multiplication) between the computed correlation power represented by the output data from the delay element 104 and the mid-sample reference correlation power. The multiplier 109 informs the adder 118 of the calculated mid-sample product.

The multiplier 110 receives the output data from the delay element 106. The multiplier 110 receives the reference signal from the memory 111 which represents the former-sample reference correlation power. The multiplier 110 calculates the product (the multiplication) between the computed correlation power represented by the output data from the delay element 106 and the former-sample reference correlation power. The multiplier 110 informs the adder 118 of the calculated former-sample product.

The adder 118 calculates the sum of the later-sample product, the mid-sample product, and the former-sample product. The adder 118 informs the calculator 120 of the calculated product sum. The calculator 120 doubles the calculated product sum. The calculator 120 informs the calculator 132 of twice the product sum.

The calculator 122 receives the output data from the delay element 102. The calculator 122 computes the square of the computed correlation power represented by the output data from the delay element 102. The calculator 122 outputs data to the delay element 124 which represents the computed square of the correlation power.

The delay elements 124, 126, and 128 compose a 3-stage shift register into which the output data from the calculator 122 is stored sample by sample. The output data from the calculator 122 is propagated through the 3-stage shift register while receiving a 1-sample delay by each of the delay elements 124, 126, and 128. The data outputted from the delay element 124 precedes the output data from the calculator 122 by a 1-sample time interval. The data outputted from the delay element 126 precedes the output data from the delay element 124 by a 1-sample time interval. Accordingly, the output data from the delay element 126 represents a computed correlation power square corresponding to a sample immediately preceding a sample related to a computed correlation power square represented by the output data from the delay element 124. The data outputted from the delay element 128 precedes the data outputted from the delay element 124 by a 2-sample time interval. Accordingly, the output data from the delay element 128 represents a computed correlation power square corresponding to a second immediately preceding sample with respect to a sample related to a computed correlation power square represented by the output data from the delay element 124. The adder 130 receives the output data from the delay element 124, the output data from the delay element 126, and the output data from the delay element 128 which represent the computed correlation power squares for three successive samples. The adder 130 calculates the sum of the computed correlation power squares. The adder 130 informs the calculator 132 of the calculated sum of the correlation power squares.

The memory 111 stores a reference signal representing the sum of the squares of the reference correlation powers for three successive samples. As previously described, the reference correlation power squares are predetermined to agree with computed correlation power squares available in given good receiving conditions or given ideal receiving conditions. The memory 111 informs the calculator 132 of the sum of the reference correlation power squares.

The calculator 132 subtracts twice the product sum, represented by the output signal of the calculator 120, from the sum of the correlation power squares which is represented by the output signal of the adder 130. The calculator 132 adds the sum of the reference correlation power squares, represented by the output signal of the memory 111, to the result of the previously-indicated subtraction. The result of this addition corresponds to a synthetic error. For every sample interval, the calculator 132 generates and outputs a data piece representing the synthetic error.

The delay elements 102, 104, and 106, the multipliers 108, 109, and 110, the memory 111, the adder 118, the calculators 120 and 122, the delay elements 124, 126, and 128, the adder 130, and the calculator 132 in the error detection circuit 45A cooperate to calculate the synthetic error "e(t)" according to the following equation.

$$e(t) = \sum_{n=0}^{2} \{x(t+nT) - y(n)\}^2 \qquad (6)$$

$$= \sum_{n=0}^{2} x(t+nT)^2 - 2 \sum_{n=0}^{2} x(t+nT)y(n) + \sum_{n=0}^{2} y(n)^2$$

where "n" denotes an integer corresponding to each of three successive samples; "t" denotes a time point; "T" denotes a 1-sample time interval; "x(t+nT)" denotes the calculated correlation powers for three successive samples; and "y(n)" denotes the reference correlation powers for three successive samples.

The decision circuit 42A follows the error detection circuit 45A. The input side of the decision circuit 42A is connected to the output side of the calculator 132 in the error detection circuit 45A. For every sample interval, the decision circuit 42A receives the output data piece from the calculator 132 which represents the synthetic error. The decision circuit 42A includes a comparator. For every sample interval, the comparator in the decision circuit 42A determines whether or not the synthetic error is greater than a predetermined threshold value. When the synthetic error is equal to or smaller than the threshold value, the decision circuit 42A outputs a signal of "1" as an indication of agreement between a symbol represented by a pair of the received in-phase signal and the received quadrature signal and the given symbol represented by a pair of the reference in-phase signal and the reference quadrature signal. On the other hand, when the synthetic error is greater than the threshold value, the decision circuit 42A outputs a signal of "0" as an indication of disagreement between a symbol represented by a pair of the received in-phase signal and the received quadrature signal and the given symbol represented by a pair of the reference in-phase signal and the reference quadrature signal.

The output signal of the decision circuit 42A is fed to a signal generator (not shown) for producing a symbol clock signal (a symbol timing signal). The signal generator controls the phase of the produced symbol clock signal in response to the output signal of the decision circuit 42A to synchronize the symbol clock signal with the received signal.

It should be noted that the error detection circuit 45A may be modified into a version having four or more stages. In this case, the error detection circuit 45A calculates the synthetic error "e(t)" according to the following equation.

$$e(t) = \sum_{n=0}^{N-1} \{x(t+nT) - y(n)\}^2 \qquad (7)$$

$$= \sum_{n=0}^{N-1} x(t+nT)^2 - 2 \sum_{n=0}^{N-1} x(t+nT)y(n) + \sum_{n=0}^{N-1} y(n)^2$$

where "n" denotes an integer corresponding to each of "N" successive samples; "t" denotes a time point; "N" denotes a given natural number corresponding to the number of stages which is equal to or greater than four; "T" denotes a 1-sample time interval; "x(t+nT)" denotes the calculated correlation powers for "N" successive samples; and "y(n)" denotes the reference correlation powers for "N" successive samples.

Third Embodiment

A third embodiment of this invention is similar to the embodiment of FIG. 1 except that a decision circuit 42B and an error detection circuit 45B replace the decision circuit 42 and the error detection circuit 45 in FIG. 1.

Figure 7:
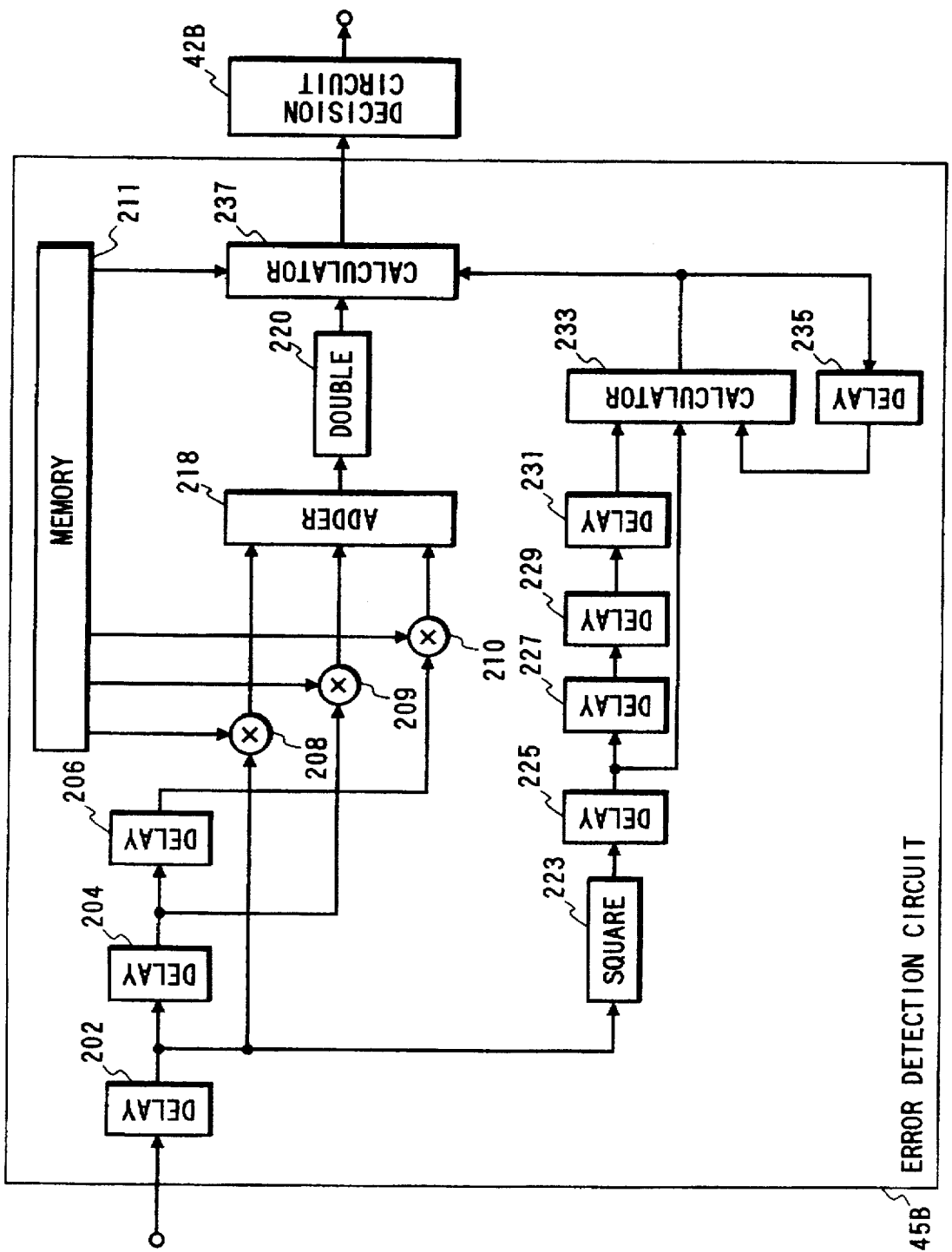
FIG. 7 is a block diagram of a part of a synchronization device according to a third embodiment of this invention.

As shown in FIG. 7, the error detection circuit 45B includes delay elements or D-type flip-flops 202, 204, and 206, multipliers 208, 209, and 210, a memory 211, an adder 218, calculators 220 and 223, delay elements or D-type flip-flops 225, 227, 229, and 231, a calculator 233, a delay element or a D-type flip-flop 235, and a calculator 237.

The input side of the delay element 202 is connected to the output side of the calculator 16 in the correlation circuit 44 (see FIG. 1). The output side of the delay element 202 is connected to the input side of the delay element 204. The output side of the delay element 202 is also connected to a first input side of the multiplier 208. Furthermore, the output side of the delay element 202 is connected to the input side of the calculator 223. The output side of the delay element 204 is connected to the input side of the delay element 206. The output side of the delay element 204 is also connected to a first input side of the multiplier 209. The output side of the delay element 206 is connected to a first input side of the multiplier 210. Second input sides of the multipliers 208, 209, and 210 are connected to the memory 211. The output side of the multiplier 208 is connected to a first input side of the adder 218. The output side of the multiplier 209 is connected to a second input side of the adder 218. The output side of the multiplier 210 is connected to a third input side of the adder 218. The output side of the adder 218 is connected to the input side of the calculator 220. The output side of the calculator 220 is connected to a first input side of the calculator 237. A second input side of the calculator 237 is connected to the memory 211.

The output side of the calculator 223 is connected to the input side of the delay element 225. The output side of the delay element 225 is connected to the input side of the delay element 227. The output side of the delay element 225 is also connected to a first input side of the calculator 233. The output side of the delay element 227 is connected to the input side of the delay element 229. The output side of the delay element 229 is connected to the input side of the delay element 231. The output side of the delay element 231 is connected to a second input side of the calculator 233. The output side of the calculator 233 is connected to a third input side of the calculator 237. The output side of the calculator 233 is also connected to the input side of the delay element 235. The output side of the delay element 235 is connected to a third input side of the calculator 233. Thus, the calculator 233 and the delay element 235 are combined to provide a feedback loop. The output side of the calculator 237 is followed by the decision circuit 42B.

The delay elements 202, 204, and 206 compose a 3-stage shift register into which the output data from the calculator 16 in the correlation circuit 44 (see FIG. 1) is stored sample by sample. The output data from the calculator 16 is propagated through the 3-stage shift register while receiving a 1-sample delay by each of the delay elements 202, 204, and 206. The data outputted from the delay element 202 precedes the output data from the calculator 16 by a 1-sample time interval. The data outputted from the delay element 204 precedes the output data from the delay element 202 by a 1-sample time interval. Accordingly, the output data from the delay element 204 represents a computed correlation power corresponding to a sample immediately preceding a sample related to a computed correlation power represented by the output data from the delay element 202. The data outputted from the delay element 206 precedes the data outputted from the delay element 202 by a 2-sample time interval. Accordingly, the output data from the delay element 206 represents a computed correlation power corresponding to a second immediately preceding sample with respect to a sample related to a computed correlation power represented by the output data from the delay element 202.

The memory 211 stores reference signals representing reference correlation powers for three successive samples (former, mid, and later samples). The reference correlation powers are predetermined to agree with computed correlation powers available in given good receiving conditions or given ideal receiving conditions.

The multiplier 208 receives the output data from the delay element 202. The multiplier 208 receives the reference signal from the memory 211 which represents the later-sample reference correlation power. The multiplier 208 calculates the product (the multiplication) between the computed correlation power represented by the output data from the delay element 202 and the later-sample reference correlation power. The multiplier 208 informs the adder 218 of the calculated later-sample product.

The multiplier 209 receives the output data from the delay element 204. The multiplier 209 receives the reference signal from the memory 211 which represents the mid-sample reference correlation power. The multiplier 209 calculates the product (the multiplication) between the computed correlation power represented by the output data from the delay element 204 and the mid-sample reference correlation power. The multiplier 209 informs the adder 218 of the calculated mid-sample product.

The multiplier 210 receives the output data from the delay element 206. The multiplier 210 receives the reference signal from the memory 211 which represents the former-sample reference correlation power. The multiplier 210 calculates the product (the multiplication) between the computed correlation power represented by the output data from the delay element 206 and the former-sample reference correlation power. The multiplier 210 informs the adder 218 of the calculated former-sample product.

The adder 218 calculates the sum of the later-sample product, the mid-sample product, and the former-sample product. The adder 218 informs the calculator 220 of the calculated product sum. The calculator 220 doubles the calculated product sum. The calculator 220 informs the calculator 237 of twice the product sum.

The calculator 223 receives the output data from the delay element 202. The calculator 223 computes the square of the computed correlation power represented by the output data from the delay element 202. The calculator 223 outputs data to the delay element 225 which represents the computed square of the correlation power.

The delay elements 225, 227, 229, and 231 compose a 4-stage shift register into which the output data from the calculator 223 is stored sample by sample. The output data from the calculator 223 is propagated through the 4-stage shift register while receiving a 1-sample delay by each of the delay elements 225, 227, 229, and 231. The data outputted from the delay element 225 precedes the output data from the calculator 223 by a 1-sample time interval. The data outputted from the delay element 231 precedes the data outputted from the delay element 225 by a 3-sample time interval. Accordingly, the output data from the delay element 231 represents a computed correlation power square corresponding to a third immediately preceding sample with respect to a sample related to a computed correlation power square represented by the output data from the delay element 225. The calculator 233 receives the output data from the delay element 225, the output data from the delay element 231, and the output data from the delay element 235. The calculator 233 computes the sum of the correlation power squares for three successive samples in response to the output data from the delay element 225, the output data from the delay element 231, and the output data from the delay element 235. The calculator 233 outputs data representing the computed sum of the correlation power squares. The output data from the calculator 233 is returned to the input side of the calculator 233 via the delay element 235 which provides a 1-sample delay. The calculator 233 subtracts the correlation power square, represented by the output signal of the delay element 231, from the immediately-preceding sum of the correlation power squares which is represented by the output signal of the delay element 235. The calculator 233 adds the correlation power square, represented by the output signal of the delay element 225, to the result of the previously-indicated subtraction. The result of this addition corresponds to the current sum of the correlation power squares for three successive samples. The calculator 233 informs the calculator 237 of the calculated sum of the correlation power squares.

The memory 211 stores a reference signal representing the sum of the squares of the reference correlation powers for three successive samples. As previously described, the reference correlation power squares are predetermined to agree with computed correlation power squares available in given good receiving conditions or given ideal receiving conditions. The memory 211 informs the calculator 237 of the sum of the reference correlation power squares.

The calculator 237 subtracts twice the product sum, represented by the output signal of the calculator 220, from the sum of the correlation power squares which is represented by the output signal of the calculator 233. The calculator 237 adds the sum of the reference correlation power squares, represented by the output signal of the memory 211, to the result of the previously-indicated subtraction. The result of this addition corresponds to a synthetic error. For every sample interval, the calculator 237 generates and outputs a data piece representing the synthetic error.

The delay elements 202, 204, and 206, the multipliers 208, 209, and 210, the memory 211, the adder 218, the calculators 220 and 223, the delay elements 225, 227, 229, and 231, the calculator 233, the delay element 235, and the calculator 237 in the error detection circuit 45B cooperate to calculate the synthetic error "e(t)" according to the previously-indicated equation (6).

The decision circuit 42B follows the error detection circuit 45B. The input side of the decision circuit 42B is connected to the output side of the calculator 237 in the error detection circuit 45B. For every sample interval, the decision circuit 42B receives the output data piece from the calculator 237 which represents the synthetic error. The decision circuit 42B includes a comparator. For every sample interval, the comparator in the decision circuit 42B determines whether or not the synthetic error is greater than a predetermined threshold value. When the synthetic error is equal to or smaller than the threshold value, the decision circuit 42B outputs a signal of "1" as an indication of agreement between a symbol represented by a pair of the received in-phase signal and the received quadrature signal and the given symbol represented by a pair of the reference in-phase signal and the reference quadrature signal. On the other hand, when the synthetic error is greater than the threshold value, the decision circuit 42B outputs a signal of "0" as an indication of disagreement between a symbol represented by a pair of the received in-phase signal and the received quadrature signal and the given symbol represented by a pair of the reference in-phase signal and the reference quadrature signal.

The output signal of the decision circuit 42B is fed to a signal generator (not shown) for producing a symbol clock signal (a symbol timing signal). The signal generator controls the phase of the produced symbol clock signal in response to the output signal of the decision circuit 42B to synchronize the symbol clock signal with the received signal.

It should be noted that the error detection circuit 45B may be modified into a version having four or more stages. In this case, the error detection circuit 45B calculates the synthetic error "e(t)" according to the previously-indicated equation (7).

Fourth Embodiment

A fourth embodiment of this invention is similar to the embodiment of FIG. 1 except that a decision circuit 42C and an error detection circuit 45C replace the decision circuit 42 and the error detection circuit 45 in FIG. 1.

Figure 8:
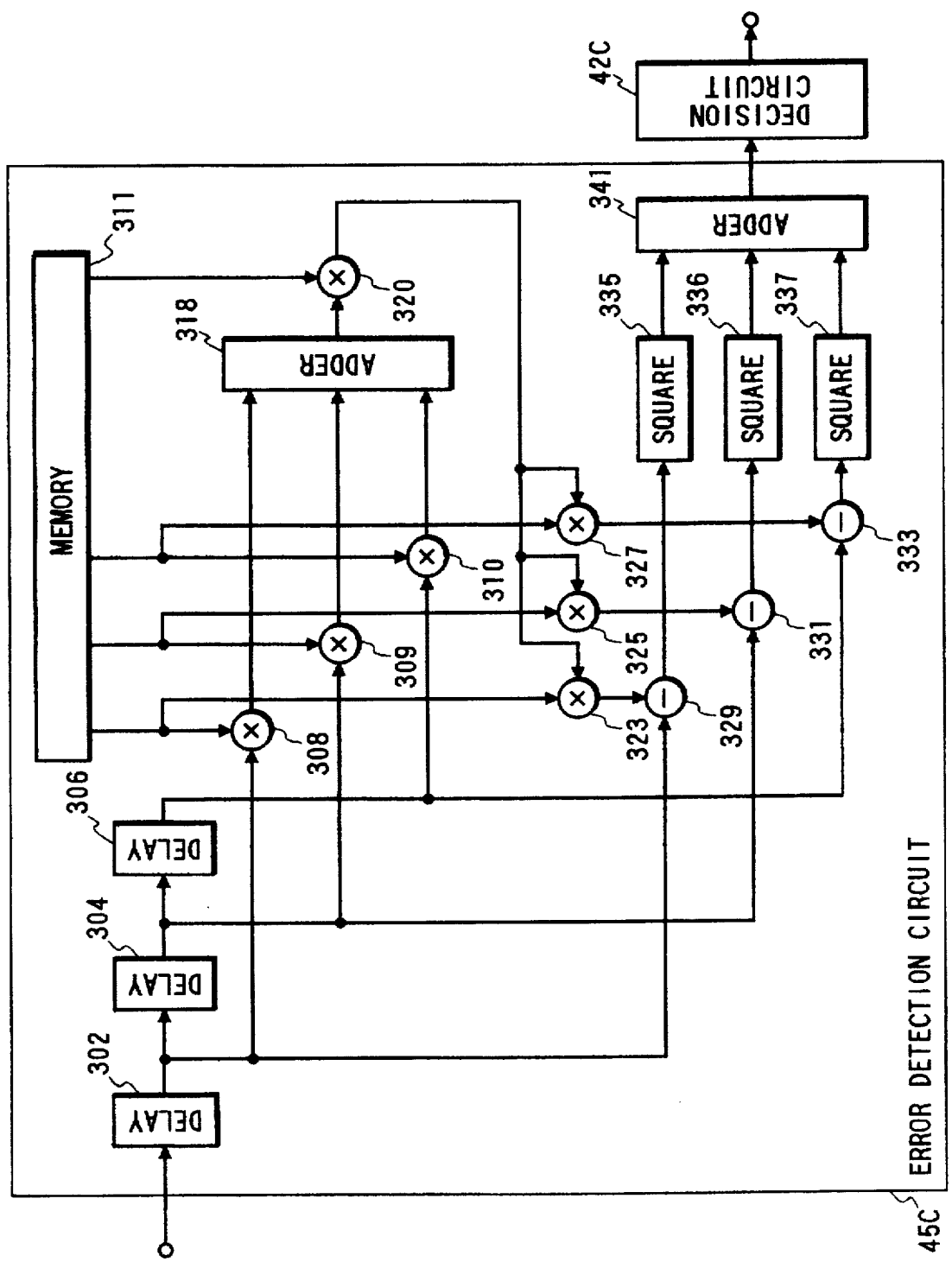
FIG. 8 is a block diagram of a part of a synchronization device according to a fourth embodiment of this invention.

As shown in FIG. 8, the error detection circuit 45C includes delay elements or D-type flip-flops 302, 304, and 306, multipliers 308, 309, and 310, a memory 311, an adder 318, multipliers 320, 323, 325, and 327, subtracters 329, 331, and 333, calculators 335, 336, and 337, and an adder 341.

The input side of the delay element 302 is connected to the output side of the calculator 16 in the correlation circuit 44 (see FIG. 1). The output side of the delay element 302 is connected to the input side of the delay element 304. The output side of the delay element 302 is also connected to a first input side of the multiplier 308. Furthermore, the output side of the delay element 302 is connected to a first input side of the subtracter 329. The output side of the delay element 304 is connected to the input side of the delay element 306. The output side of the delay element 304 is also connected to a first input side of the multiplier 309. Furthermore, the output side of the delay element 304 is connected to a first input side of the subtracter 331. The output side of the delay element 306 is connected to a first input side of the multiplier 310. The output side of the delay element 306 is also connected to a first input side of the subtracter 333. Second input sides of the multipliers 308, 309, and 310 are connected to the memory 311. The output side of the multiplier 308 is connected to a first input side of the adder 318. The output side of the multiplier 309 is connected to a second input side of the adder 318. The output side of the multiplier 310 is connected to a third input side of the adder 318. The output side of the adder 318 is connected to a first input side of the multiplier 320. A second input side of the multiplier 320 is connected to the memory 311.

First input sides of the multipliers 323, 325, and 327 are connected to the output side of the multiplier 320. Second input sides of the multipliers 323, 325, and 327 are connected to the memory 311. The output side of the multiplier 323 is connected to a second input side of the subtracter 329. The output side of the multiplier 325 is connected to a second input side of the subtracter 331. The output side of the multiplier 327 is connected to a second input side of the subtracter 333. The output side of the subtracter 329 is connected to the input side of the calculator 335. The output side of the calculator 335 is connected to a first input side of the adder 341. The output side of the subtracter 331 is connected to the input side of the calculator 336. The output side of the calculator 336 is connected to a second input side of the adder 341. The output side of the subtracter 333 is connected to the input side of the calculator 337. The output side of the calculator 337 is connected to a third input side of the adder 341. The output side of the adder 341 is followed by the decision circuit 42C.

The delay elements 302, 304, and 306 compose a 3-stage shift register into which the output data from the calculator 16 in the correlation circuit 44 (see FIG. 1) is stored sample by sample. The output data from the calculator 16 is propagated through the 3-stage shift register while receiving a 1-sample delay by each of the delay elements 302, 304, and 306. The data outputted from the delay element 302 precedes the output data from the calculator 16 by a 1-sample time interval. The data outputted from the delay element 304 precedes the output data from the delay element 302 by a 1-sample time interval. Accordingly, the output data from the delay element 304 represents a computed correlation power corresponding to a sample immediately preceding a sample related to a computed correlation power represented by the output data from the delay element 302. The data outputted from the delay element 306 precedes the data outputted from the delay element 302 by a 2-sample time interval. Accordingly, the output data from the delay element 306 represents a computed correlation power corresponding to a second immediately preceding sample with respect to a sample related to a computed correlation power represented by the output data from the delay element 302.

The memory 311 stores reference signals representing reference correlation powers for three successive samples (former, mid, and later samples). The reference correlation powers are predetermined to agree with computed correlation powers available in given good receiving conditions or given ideal receiving conditions.

The multiplier 308 receives the output data from the delay element 302. The multiplier 308 receives the reference signal from the memory 311 which represents the later-sample reference correlation power. The multiplier 308 calculates the product (the multiplication) between the computed correlation power represented by the output data from the delay element 302 and the later-sample reference correlation power. The multiplier 308 informs the adder 318 of the calculated later-sample product.

The multiplier 309 receives the output data from the delay element 304. The multiplier 309 receives the reference signal from the memory 311 which represents the mid-sample reference correlation power. The multiplier 309 calculates the product (the multiplication) between the computed correlation power represented by the output data from the delay element 304 and the mid-sample reference correlation power. The multiplier 309 informs the adder 318 of the calculated mid-sample product.

The multiplier 310 receives the output data from the delay element 306. The multiplier 310 receives the reference signal from the memory 311 which represents the former-sample reference correlation power. The multiplier 310 calculates the product (the multiplication) between the computed correlation power represented by the output data from the delay element 306 and the former-sample reference correlation power. The multiplier 310 informs the adder 318 of the calculated former-sample product.

The adder 318 calculates the sum of the later-sample product, the mid-sample product, and the former-sample product. The adder 318 informs the multiplier 320 of the calculated product sum.

The memory 311 stores a reference signal representing the reciprocal of the sum of the squares of the reference correlation powers for three successive samples. As previously described, the reference correlation power squares are predetermined to agree with computed correlation power squares available in given good receiving conditions or given ideal receiving conditions. The memory 311 informs the multiplier 320 of the reciprocal of the sum of the reference correlation power squares.

The multiplier 320 calculates the product (the multiplication) between the calculated product sum represented by the output signal of the adder 3 18 and the reciprocal of the sum of the reference correlation power squares which is represented by the output signal of the memory 311. The product calculated by the multiplier 320 corresponds to a corrective factor "a" which is given as:

$$a = \left[ \sum_{n=0}^{2} x(t+nT)y(n) \right] / \left[ \sum_{n=0}^{2} y(n)^2 \right] \quad (8)$$

where "n" denotes an integer corresponding to each of three successive samples; "t" denotes a time point; "T" denotes a 1-sample time interval; "x(t+nT)" denotes the calculated correlation powers for three successive samples; and "y(n)" denotes the reference correlation powers for three successive samples. The multiplier 320 outputs a signal representing the corrective factor "a".

The multiplier 323 is informed of the corrective factor "a" by the multiplier 320. The multiplier 323 receives the reference signal from the memory 311 which represents the later-sample reference correlation power. The multiplier 323 corrects the later-sample reference correlation power in response to the corrective factor "a". Specifically, the multiplier 323 calculates the product (the multiplication) between the later-sample reference correlation power and the corrective factor "a". The multiplier 323 outputs a signal representing the correction-resultant later-sample reference correlation power.

The multiplier 325 is informed of the corrective factor "a" by the multiplier 320. The multiplier 325 receives the reference signal from the memory 311 which represents the mid-sample reference correlation power. The multiplier 325 corrects the mid-sample reference correlation power in response to the corrective factor "a". Specifically, the multiplier 325 calculates the product (the multiplication) between the mid-sample reference correlation power and the corrective factor "a". The multiplier 325 outputs a signal representing the correction-resultant mid-sample reference correlation power.

The multiplier 327 is informed of the corrective factor "a" by the multiplier 320. The multiplier 327 receives the reference signal from the memory 311 which represents the former-sample reference correlation power. The multiplier 327 corrects the former-sample reference correlation power in response to the corrective factor "a". Specifically, the multiplier 327 calculates the product (the multiplication) between the former-sample reference correlation power and the corrective factor "a". The multiplier 327 outputs a signal representing the correction-resultant former-sample reference correlation power.

The subtracter 329 receives the output data from the delay element 302. The subtracter 329 receives the output signal of the multiplier 323 which represents the correction-resultant later-sample reference correlation power. The subtracter 329 calculates the difference (the error) between the computed correlation power represented by the output data from the delay element 302 and the correction-resultant later-sample reference correlation power. The subtracter 329 informs the calculator 335 of the calculated later-sample difference (the calculated later-sample error). The calculator 335 computes the square of the later-sample difference (the later-sample error).

The subtracter 331 receives the output data from the delay element 304. The subtracter 331 receives the output signal of the multiplier 325 which represents the correction-resultant mid-sample reference correlation power. The subtracter 331 calculates the difference (the error) between the computed correlation power represented by the output data from the delay element 304 and the correction-resultant mid-sample reference correlation power. The subtracter 331 informs the calculator 336 of the calculated mid-sample difference (the calculated mid-sample error). The calculator 336 computes the square of the mid-sample difference (the mid-sample error).

The subtracter 333 receives the output data from the delay element 306. The subtracter 333 receives the output signal of the multiplier 327 which represents the correction-resultant former-sample reference correlation power. The subtracter 333 calculates the difference (the error) between the computed correlation power represented by the output data from the delay element 306 and the correction-resultant former-sample reference correlation power. The subtracter 333 informs the calculator 337 of the calculated former-sample difference (the calculated former-sample error). The calculator 337 computes the square of the former-sample difference (the former-sample error).

The adder 341 is informed of the square of the later-sample difference (the later-sample error), the square of the mid-sample difference (the mid-sample error), and the square of the former-sample difference (the former-sample error) by the calculators 335, 336, and 337. For every sample interval, the adder 341 calculates the sum of the square of the later-sample difference (the later-sample error), the square of the mid-sample difference (the mid-sample error), and the square of the former-sample difference (the former-sample error). The calculated sum corresponds to a synthetic error between the calculated correlation powers and the correction-resultant reference correlation powers for the three successive samples (the former, mid, and later samples). For every sample interval, the adder 341 generates and outputs a data piece representing the synthetic error.

The delay elements 302, 304, and 306, the multipliers 308, 309, and 310, the memory 311, the adder 318, the multipliers 320, 323, 325, and 327, the subtracters 329, 331, and 333, the calculators 335, 336, and 337, and the adder 341 in the error detection circuit 45C cooperate to calculate the synthetic error "e(t)" according to the following equation.

$$e(t) = \sum_{n=0}^{2} \{x(t+nT) - ay(n)\}^2 \quad (9)$$

where "n" denotes an integer corresponding to each of three successive samples; "t" denotes a time point; "T" denotes a 1-sample time interval; "x(t+nT)" denotes the calculated correlation powers for three successive samples; "y(n)" denotes the reference correlation powers for three successive samples; and "a" denotes the corrective factor given by the previously-indicated equation (8).

The decision circuit 42C follows the error detection circuit 45C. The input side of the decision circuit 42C is connected to the output side of the adder 341 in the error detection circuit 45C. For every sample interval, the decision circuit 42C receives the output data piece from the adder 341 which represents the synthetic error. The decision circuit 42C includes a comparator. For every sample interval, the comparator in the decision circuit 42C determines whether or not the synthetic error is greater than a predetermined threshold value. When the synthetic error is equal to or smaller than the threshold value, the decision circuit 42C outputs a signal of "1" as an indication of agreement between a symbol represented by a pair of the received in-phase signal and the received quadrature signal and the given symbol represented by a pair of the reference in-phase signal and the reference quadrature signal. On the other hand, when the synthetic error is greater than the threshold value, the decision circuit 42C outputs a signal of "0" as an indication of disagreement between a symbol represented by a pair of the received in-phase signal and the received quadrature signal and the given symbol represented by a pair of the reference in-phase signal and the reference quadrature signal.

The output signal of the decision circuit 42C is fed to a signal generator (not shown) for producing a symbol clock signal (a symbol timing signal). The signal generator controls the phase of the produced symbol clock signal in response to the output signal of the decision circuit 42C to synchronize the symbol clock signal with the received signal.

The corrective factor "a" is determined as follows. First, the synthetic error "e(t)" given by the previously-indicated equation (9) is differentiated with respect to the value "a". Then, the result of the differentiation is set to zero. Thus, the corrective factor "a" is determined by the following relation.

$$\frac{\partial e(t)}{\partial a} = -2 \sum_{n=0}^{2} x(t+nT)y(n) + 2a \sum_{n=0}^{2} y(n)^2 \quad (10)$$
$$= 0$$

This relation provides the previously-indicated equation (8).

The correction of the reference correlation powers in response to the corrective factor "a" compensates for a change in the calculated correlation powers which might be caused by, for example, fading of the received radio signal.

It should be noted that the error detection circuit 45C may be modified into a version having four or more stages. In this case, the error detection circuit 45C calculates the synthetic error "e(t)" according to the following equation.

$$e(t) = \sum_{n=0}^{N-1} \{x(t+nT) - ay(n)\}^2 \quad (11)$$

where "n" denotes an integer corresponding to each of "N" successive samples; "t" denotes a time point; "N" denotes a given natural number corresponding to the number of stages which is equal to or greater than four; "T" denotes a 1-sample time interval; "x(t+nT)" denotes the calculated correlation powers for "N" successive samples; "y(n)" denotes the reference correlation powers for "N" successive samples; and "a" denotes the corrective factor given as:

$$a = \left[\sum_{n=0}^{N-1} x(t+nT)y(n)\right] / \left[\sum_{n=0}^{N-1} y(n)^2\right] \quad (12)$$

Fifth Embodiment

A fifth embodiment of this invention is similar to the embodiment of FIG. 1 except that a decision circuit 42D and an error detection circuit 45D replace the decision circuit 42 and the error detection circuit 45 in FIG. 1.

Figure 9:
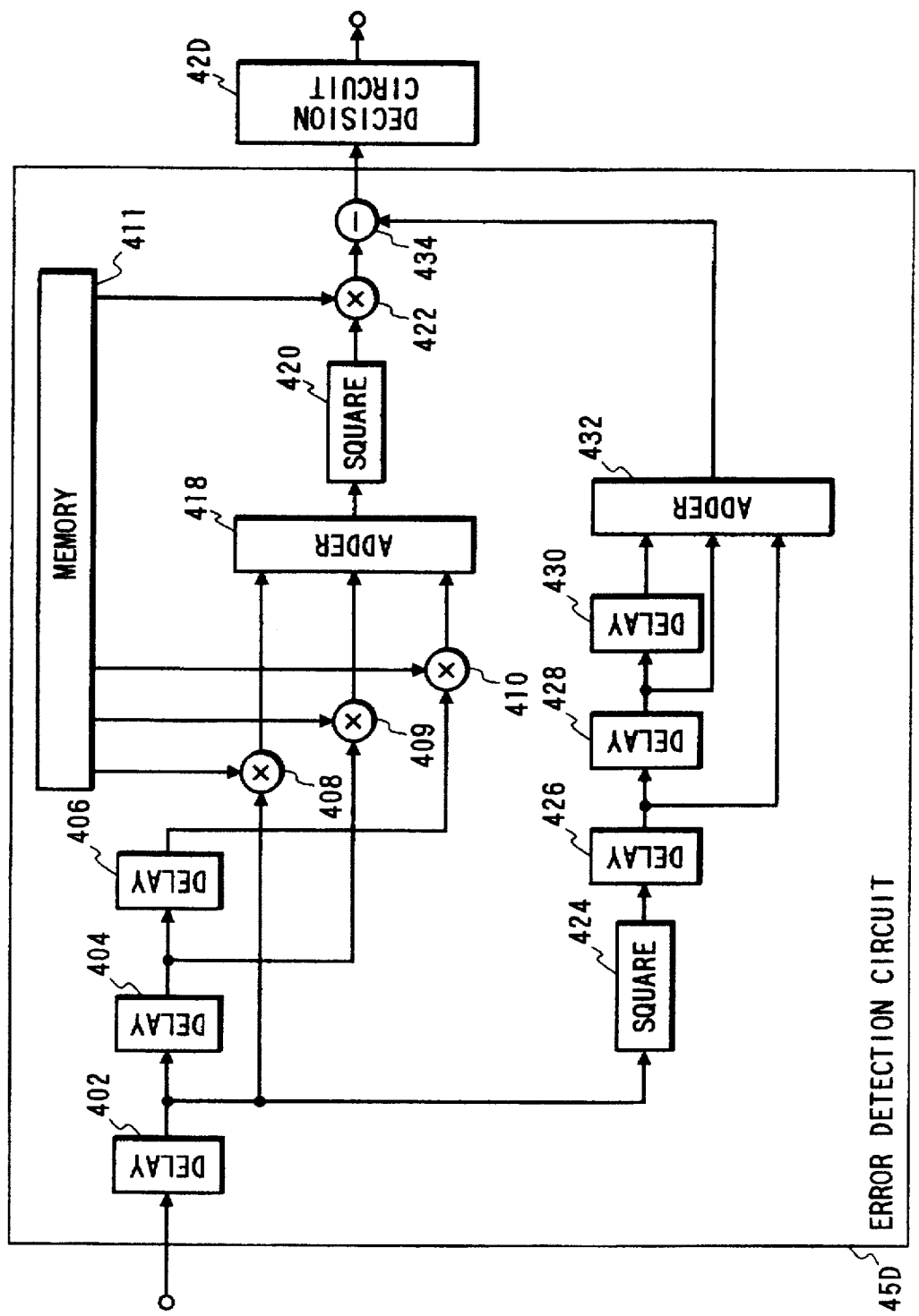
FIG. 9 is a block diagram of a part of a synchronization device according to a fifth embodiment of this invention.

As shown in FIG. 9, the error detection circuit 45D includes delay elements or D-type flip-flops 402, 404, and 406, multipliers 408, 409, and 410, a memory 411, an adder 418, a calculator 420, a multiplier 422, a calculator 424, delay elements or D-type flip-flops 426, 428, and 430, an adder 432, and a subtracter 434.

The input side of the delay element 402 is connected to the output side of the calculator 16 in the correlation circuit 44 (see FIG. 1). The output side of the delay element 402 is connected to the input side of the delay element 404. The output side of the delay element 402 is also connected to a first input side of the multiplier 408. Furthermore, the output side of the delay element 402 is connected to the input side of the calculator 424. The output side of the delay element 404 is connected to the input side of the delay element 406. The output side of the delay element 404 is also connected to a first input side of the multiplier 409. The output side of the delay element 406 is connected to a first input side of the multiplier 410. Second input sides of the multipliers 408, 409, and 410 are connected to the memory 411. The output side of the multiplier 408 is connected to a first input side of the adder 418. The output side of the multiplier 409 is connected to a second input side of the adder 418. The output side of the multiplier 410 is connected to a third input side of the adder 418. The output side of the adder 418 is connected to the input side of the calculator 420. The output side of the calculator 420 is connected to a first input side of the multiplier 422. A second input side of the multiplier 422 is connected to the memory 411. The output side of the multiplier 422 is connected to a first input side of the subtracter 434.

The output side of the calculator 424 is connected to the input side of the delay element 426. The output side of the delay element 426 is connected to the input side of the delay element 428. The output side of the delay element 426 is also connected to a first input side of the adder 432. The output side of the delay element 428 is connected to the input side of the delay element 430. The output side of the delay element 428 is also connected to a second input side of the adder 432. The output side of the delay element 430 is connected to a third input side of the adder 432. The output side of the adder 432 is connected to a second input side of the subtracter 434. The output side of the subtracter 434 is followed by the decision circuit 42D.

The delay elements 402, 404, and 406 compose a 3-stage shift register into which the output data from the calculator 16 in the correlation circuit 44 (see FIG. 1) is stored sample by sample. The output data from the calculator 16 is propagated through the 3-stage shift register while receiving a 1-sample delay by each of the delay elements 402, 404, and 406. The data outputted from the delay element 402 precedes the output data from the calculator 16 by a 1-sample time interval. The data outputted from the delay element 404 precedes the output data from the delay element 402 by a 1-sample time interval. Accordingly, the output data from the delay element 404 represents a computed correlation power corresponding to a sample immediately preceding a sample related to a computed correlation power represented by the output data from the delay element 402. The data outputted from the delay element 406 precedes the data outputted from the delay element 402 by a 2-sample time interval. Accordingly, the output data from the delay element 406 represents a computed correlation power corresponding to a second immediately preceding sample with respect to a sample related to a computed correlation power represented by the output data from the delay element 402.

The memory 411 stores reference signals representing reference correlation powers for three successive samples (former, mid, and later samples). The reference correlation powers are predetermined to agree with computed correlation powers available in given good receiving conditions or given ideal receiving conditions.

The multiplier 408 receives the output data from the delay element 402. The multiplier 408 receives the reference signal from the memory 411 which represents the later-sample reference correlation power. The multiplier 408 calculates the product (the multiplication) between the computed correlation power represented by the output data from the delay element 402 and the later-sample reference correlation power. The multiplier 408 informs the adder 418 of the calculated later-sample product.

The multiplier 409 receives the output data from the delay element 404. The multiplier 409 receives the reference signal from the memory 411 which represents the mid-sample reference correlation power. The multiplier 409 calculates the product (the multiplication) between the computed correlation power represented by the output data from the delay element 404 and the mid-sample reference correlation power. The multiplier 409 informs the adder 418 of the calculated mid-sample product.

The multiplier 410 receives the output data from the delay element 406. The multiplier 410 receives the reference signal from the memory 411 Which represents the former-sample reference correlation power. The multiplier 410 calculates the product (the multiplication) between the computed correlation power represented by the output data from the delay element 406 and the former-sample reference correlation power. The multiplier 410 informs the adder 418 of the calculated former-sample product.

The adder 418 calculates the sum of the later-sample product, the mid-sample product, and the former-sample product. The adder 418 informs the calculator 420 of the calculated product sum. The calculator 420 computes the square of the product sum. The calculator 420 informs the multiplier 422 of the computed square of the product sum.

The memory 411 stores a reference signal representing the reciprocal of the sum of the squares of the reference correlation powers for three successive samples. As previously described, the reference correlation power squares are predetermined to agree with computed correlation power squares available in given good receiving conditions or given ideal receiving conditions. The memory 411 informs the multiplier 422 of the reciprocal of the sum of the reference correlation power squares.

The multiplier 422 calculates the product (the multiplication) between the product sum square represented by the output signal of the calculator 420 and the reciprocal of the sum of the reference correlation power squares which is represented by the output signal of the memory 411. The product "Pt" calculated by the multiplier 422 is expressed as follows.

$$Pt = \left\{ \sum_{n=0}^{2} x(t+nT)y(n) \right\}^2 / \left\{ \sum_{n=0}^{2} y(n)^2 \right\} \tag{13}$$

where "n" denotes an integer corresponding to each of three successive samples; "t" denotes a time point; "T" denotes a 1-sample time interval; "x(t+nT)" denotes the calculated correlation powers for three successive samples; and "y(n)" denotes the reference correlation powers for three successive samples. The multiplier 422 outputs a signal representing the calculated product "Pt".

The calculator 424 receives the output data from the delay element 402. The calculator 424 computes the square of the computed correlation power represented by the output data from the delay element 402. The calculator 424 outputs data to the delay element 426 which represents the computed square of the correlation power.

The delay elements 426, 428, and 430 compose a 3-stage shift register into which the output data from the calculator 424 is stored sample by sample. The output data from the calculator 424 is propagated through the 3-stage shift register while receiving a 1-sample delay by each of the delay elements 426, 428, and 430. The data outputted from the delay element 426 precedes the output data from the calculator 424 by a 1-sample time interval. The data outputted from the delay element 428 precedes the output data from the delay element 426 by a 1-sample time interval. Accordingly, the output data from the delay element 428 represents a computed correlation power square corresponding to a sample immediately preceding a sample related to a computed correlation power square represented by the output data from the delay element 426. The data outputted from the delay element 430 precedes the data outputted from the delay element 426 by a 2-sample time interval. Accordingly, the output data from the delay element 430 represents a computed correlation power square corresponding to a second immediately preceding sample with respect to a sample related to a computed correlation power square represented by the output data from the delay element 426. The adder 432 receives the output data from the delay element 426, the output data from the delay element 428, and the output data from the delay element 430 which represent the computed correlation power squares for three successive samples. The adder 432 calculates the sum of the computed correlation power squares. The adder 432 outputs a signal representing the calculated sum of the correlation power squares.

The subtracter 434 receives the output signal of the multiplier which represents the product "Pt". The subtracter 434 receives the output signal of the adder 432 which represents the sum of the correlation power squares. The subtracter 434 subtracts the product "Pt" from the sum of the correlation power squares. The result of this subtraction corresponds to a synthetic error. For every sample interval, the subtracter 434 generates and outputs a data piece representing the synthetic error.

The delay elements 402, 404, and 406, the multipliers 408, 409, and 410, the memory 411, the adder 418, the calculator 420, the multiplier 422, the calculator 424, the delay elements 426, 428, and 430, the adder 432, and the subtracter 434 in the error detection circuit 45D cooperate to calculate the synthetic error "e(t)" according to the following equation.

$$\begin{aligned} e(t) &= \sum_{n=0}^{2} \{x(t+nT) - ay(n)\}^2 \\ &= \sum_{n=0}^{2} x(t+nT)^2 - 2a \sum_{n=0}^{2} x(t+nT)y(n) + a^2 \sum_{n=0}^{2} y(n)^2 \\ &= \sum_{n=0}^{2} x(t+nT)^2 - Pt \end{aligned} \tag{14}$$

where "n" denotes an integer corresponding to each of three successive samples; "t" denotes a time point; "T" denotes a 1-sample time interval; "x(t+nT)" denotes the calculated correlation powers for three successive samples; "y(n)" denotes the reference correlation powers for three successive samples; "a" denotes the corrective factor given by the previously-indicated equation (8); and "Pt" denotes the value given by the previously-indicated equation (13).

The decision circuit 42D follows the error detection circuit 45D. The input side of the decision circuit 42D is connected to the output side of the subtracter 434 in the error detection circuit 45D. For every sample interval, the decision circuit 42D receives the output data piece from the subtracter 434 which represents the synthetic error. The decision circuit 42D includes a comparator. For every sample interval, the comparator in the decision circuit 42D determines whether or not the synthetic error is greater than a predetermined threshold value. When the synthetic error is equal to or smaller than the threshold value, the decision circuit 42D outputs a signal of "1" as an indication of agreement between a symbol represented by a pair of the received in-phase signal and the received quadrature signal and the given symbol represented by a pair of the reference in-phase signal and the reference quadrature signal. On the other hand, when the synthetic error is greater than the threshold value, the decision circuit 42D outputs a signal of "0" as an indication of disagreement between a symbol represented by a pair of the received in-phase signal and the received quadrature signal and the given symbol represented by a pair of the reference in-phase signal and the reference quadrature signal.

The output signal of the decision circuit 42D is fed to a signal generator (not shown) for producing a symbol clock signal (a symbol timing signal). The signal generator controls the phase of the produced symbol clock signal in response to the output signal of the decision circuit 42D to synchronize the symbol clock signal with the received signal.

It should be noted that the error detection circuit 45D may be modified into a version having four or more stages. In this case, the error detection circuit 45D calculates the synthetic error "e(t)" according to the following equations.

$$e(t) = \sum_{n=0}^{N-1} x(t+nT)^2 - Pt \qquad (15)$$

$$Pt = \left\{ \sum_{n=0}^{N-1} x(t+nT)y(n) \right\}^2 / \left\{ \sum_{n=0}^{N-1} y(n)^2 \right\} \qquad (16)$$

where "n" denotes an integer corresponding to each of "N" successive samples; "t" denotes a time point; "N" denotes a given natural number corresponding to the number of stages which is equal to or greater than four; "T" denotes a 1-sample time interval; "x(t+nT)" denotes the calculated correlation powers for "N" successive samples; and "y(n)" denotes the reference correlation powers for "N" successive samples.

Sixth Embodiment

A sixth embodiment of this invention is similar to the embodiment of FIG. 1 except that a decision circuit 42E and an error detection circuit 45E replace the decision circuit 42 and the error detection circuit 45 in FIG. 1.

Figure 10:
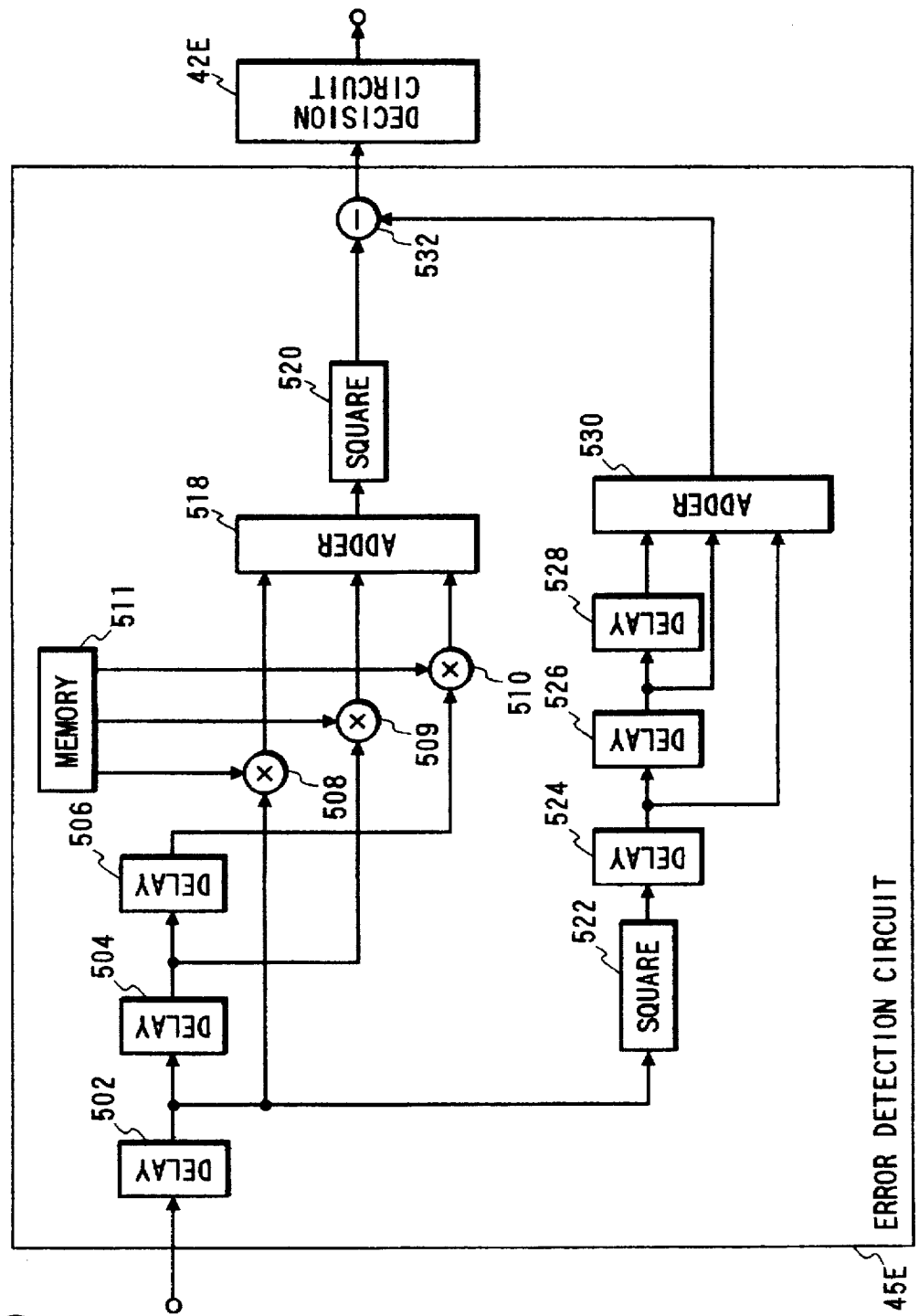
FIG. 10 is a block diagram of a part of a synchronization device according to a sixth embodiment of this invention.

As shown in FIG. 10, the error detection circuit 45E includes delay elements or D-type flip-flops 502, 504, and 506, multipliers 508, 509, and 510, a memory 511, an adder 518, calculators 520 and 522, delay elements or D-type flip-flops 524, 526, and 528, an adder 530, and a subtracter 532.

The input side of the delay element 502 is connected to the output side of the calculator 16 in the correlation circuit 44 (see FIG. 1). The output side of the delay element 502 is connected to the input side of the delay element 504. The output side of the delay element 502 is also connected to a first input side of the multiplier 508. Furthermore, the output side of the delay element 502 is connected to the input side of the calculator 522. The output side of the delay element 504 is connected to the input side of the delay element 506. The output side of the delay element 504 is also connected to a first input side of the multiplier 509. The output side of the delay element 506 is connected to a first input side of the multiplier 510. Second input sides of the multipliers 508, 509, and 510 are connected to the memory 511. The output side of the multiplier 508 is connected to a first input side of the adder 518. The output side of the multiplier 509 is connected to a second input side of the adder 518. The output side of the multiplier 510 is connected to a third input side of the adder 518. The output side of the adder 518 is connected to the input side of the calculator 520. The output side of the calculator 520 is connected to a first input side of the subtracter 532.

The output side of the calculator 522 is connected to the input side of the delay element 524. The output side of the delay element 524 is connected to the input side of the delay element 526. The output side of the delay element 524 is also connected to a first input side of the adder 530. The output side of the delay element 526 is connected to the input side of the delay element 528. The output side of the delay element 526 is also connected to a second input side of the adder 530. The output side of the delay element 528 is connected to a third input side of the adder 530. The output side of the adder 530 is connected to a second input side of the subtracter 532. The output side of the subtracter 532 is followed by the decision circuit 42E.

The delay elements 502, 504, and 506 compose a 3-stage shift register into which the output data from the calculator 16 in the correlation circuit 44 (see FIG. 1) is stored sample by sample. The output data from the calculator 16 is propagated through the 3-stage shift register while receiving a 1-sample delay by each of the delay elements 502, 504, and 506. The data outputted from the delay element 502 precedes the output data from the calculator 16 by a 1-sample time interval. The data outputted from the delay element 504 precedes the output data from the delay element 502 by a 1-sample time interval. Accordingly, the output data from the delay element 504 represents a computed correlation power corresponding to a sample immediately preceding a sample related to a computed correlation power represented by the output data from the delay element 502. The data outputted from the delay element 506 precedes the data outputted from the delay element 502 by a 2-sample time interval. Accordingly, the output data from the delay element 506 represents a computed correlation power corresponding to a second immediately preceding sample with respect to a sample related to a computed correlation power represented by the output data from the delay element 502.

The memory 511 stores reference signals representing reference correlation powers for three successive samples (former, mid, and later samples). The reference correlation powers are predetermined to agree with computed correlation powers available in given good receiving conditions or given ideal receiving conditions.

The multiplier 508 receives the output data from the delay element 502. The multiplier 508 receives the reference signal from the memory 511 which represents the later-sample reference correlation power. The multiplier 508 calculates the product (the multiplication) between the computed correlation power represented by the output data from the delay element 502 and the later-sample reference correlation power. The multiplier 508 informs the adder 518 of the calculated later-sample product.

The multiplier 509 receives the output data from the delay element 504. The multiplier 509 receives the reference signal from the memory 511 which represents the mid-sample reference correlation power. The multiplier 509 calculates the product (the multiplication) between the computed correlation power represented by the output data from the delay element 504 and the mid-sample reference correlation power. The multiplier 509 informs the adder 518 of the calculated mid-sample product.

The multiplier 510 receives the output data from the delay element 506. The multiplier 510 receives the reference signal from the memory 511 which represents the former-sample reference correlation power. The multiplier 510 calculates the product (the multiplication) between the computed correlation power represented by the output data from the delay element 506 and the former-sample reference correlation power. The multiplier 510 informs the adder 518 of the calculated former-sample product.

The adder 518 calculates the sum of the later-sample product, the mid-sample product, and the former-sample product. The adder 518 informs the calculator 520 of the calculated product sum. The calculator 520 computes the square of the product sum. The calculator 520 outputs a signal representing the computed square of the product sum.

The calculator 522 receives the output data from the delay element 502. The calculator 522 computes the square of the computed correlation power represented by the output data from the delay element 502. The calculator 522 outputs data to the delay element 524 which represents the computed square of the correlation power.

The delay elements 524, 526, and 528 compose a 3-stage shift register into which the output data from the calculator 522 is stored sample by sample. The output data from the calculator 522 is propagated through the 3-stage shift register while receiving a 1-sample delay by each of the delay elements 524, 526, and 528. The data outputted from the delay element 524 precedes the output data from the calculator 522 by a 1-sample time interval. The data outputted from the delay element 526 precedes the output data from the delay element 524 by a 1-sample time interval. Accordingly, the output data from the delay element 526 represents a computed correlation power square corresponding to a sample immediately preceding a sample related to a computed correlation power square represented by the output data from the delay element 524. The data outputted from the delay element 528 precedes the data outputted from the delay element 524 by a 2-sample time interval. Accordingly, the output data from the delay element 528 represents a computed correlation power square corresponding to a second immediately preceding sample with respect to a sample related to a computed correlation power square represented by the output data from the delay element 524. The adder 530 receives the output data from the delay element 524, the output data from the delay element 526, and the output data from the delay element 528 which represent the computed correlation power squares for three successive samples. The adder 530 calculates the sum of the computed correlation power squares. The adder 530 outputs a signal representing the calculated sum of the correlation power squares.

The subtracter 532 receives the output signal of the calculator 520 which represents the square of the product sum. The subtracter 532 receives the output signal of the adder 530 which represents the sum of the correlation power squares. The subtracter 532 subtracts the square of the product sum from the sum of the correlation power squares. The result of this subtraction corresponds to a synthetic error. For every sample interval, the subtracter 532 generates and outputs a data piece representing the synthetic error.

The delay elements 502, 504, and 506, the multipliers 508, 509, and 510, the memory 511, the adder 518, the calculators 520 and 522, the delay elements 524, 526, and 528, the adder 530, and the subtracter 532 in the error detection circuit 45E cooperate to calculate the synthetic error "e(t)" according to the following equations.

$$e(t) = \sum_{n=0}^{2} x(t+nT)^2 - \left\{ \sum_{n=0}^{2} x(t+nT)y'(n) \right\}^2 \quad (17)$$

$$y'(t) = \frac{y(n)}{\sqrt{Y}} \quad (18)$$

$$Y = \sum_{n=0}^{2} y(n)^2 \quad (19)$$

where "n" denotes an integer corresponding to each of three successive samples; "t" denotes a time point; "T" denotes a 1-sample time interval; "x(t+nT)" denotes the calculated correlation powers for three successive samples; and "y(n)" denotes the reference correlation powers for three successive samples.

The decision circuit 42E follows the error detection circuit 45E. The input side of the decision circuit 42E is connected to the output side of the subtracter 532 in the error detection circuit 45E. For every sample interval, the decision circuit 42E receives the output data piece from the subtracter 532 which represents the synthetic error. The decision circuit 42E includes a comparator. For every sample interval, the comparator in the decision circuit 42E determines whether or not the synthetic error is greater than a predetermined threshold value. When the synthetic error is equal to or smaller than the threshold value, the decision circuit 42E outputs a signal of "1" as an indication of agreement between a symbol represented by a pair of the received in-phase signal and the received quadrature signal and the given symbol represented by a pair of the reference in-phase signal and the reference quadrature signal. On the other hand, when the synthetic error is greater than the threshold value, the decision circuit 42E outputs a signal of "0" as an indication of disagreement between a symbol represented by a pair of the received in-phase signal and the received quadrature signal and the given symbol represented by a pair of the reference in-phase signal and the reference quadrature signal.

The output signal of the decision circuit 42E is fed to a signal generator (not shown) for producing a symbol clock signal (a symbol timing signal). The signal generator controls the phase of the produced symbol clock signal in response to the output signal of the decision circuit 42E to synchronize the symbol clock signal with the received signal.

It should be noted that the error detection circuit 45E may be modified into a version having four or more stages. In this case, the error detection circuit 45E calculates the synthetic error "e(t)" according to the following equations.

$$e(t) = \sum_{n=0}^{N-1} x(t+nT)^2 - \left\{ \sum_{n=0}^{N-1} x(t+nT)y'(n) \right\}^2 \quad (20)$$

$$y'(t) = \frac{y(n)}{\sqrt{Y}} \quad (21)$$

$$Y = \sum_{n=0}^{N-1} y(n)^2 \quad (22)$$

where "n" denotes an integer corresponding to each of "N" successive samples; "t" denotes a time point; "N" denotes a given natural number corresponding to the number of stages which is equal to or greater than four; "T" denotes a 1-sample time interval; "x(t+nT)" denotes the calculated correlation powers for "N" successive samples; and "y(n)" denotes the reference correlation powers for "N" successive samples.

Seventh Embodiment

A seventh embodiment of this invention is similar to the embodiment of FIG. 1 except that a decision circuit 42F and an error detection circuit 45F replace the decision circuit 42 and the error detection circuit 45 in FIG. 1.

Figure 11:
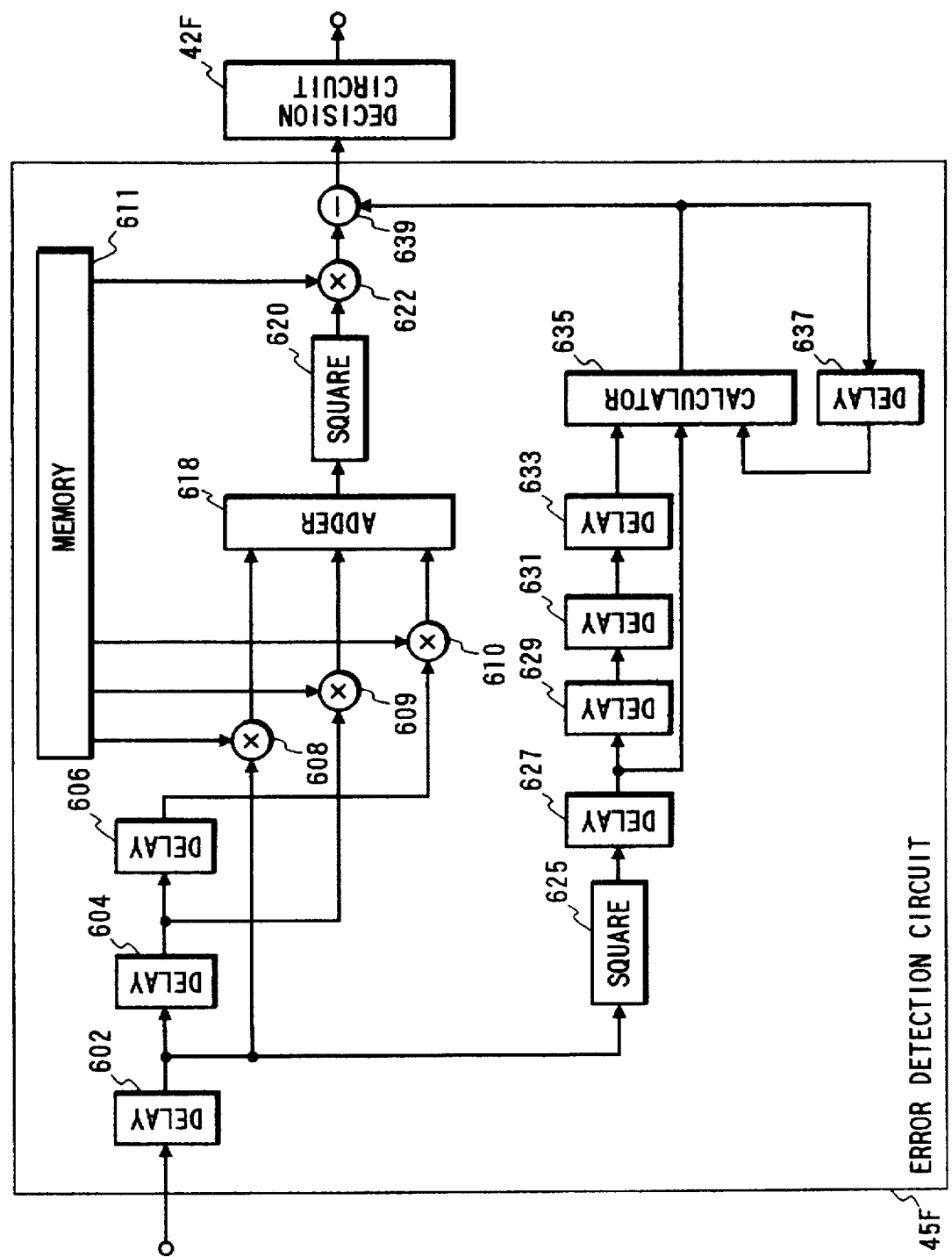
FIG. 11 is a block diagram of a part of a synchronization device according to a seventh embodiment of this invention.

As shown in FIG. 11, the error detection circuit 45F includes delay elements or D-type flip-flops 602, 604, and 606, multipliers 608, 609, and 610, a memory 611, an adder 618, a calculator 620, a multiplier 622, a calculator 625, delay elements or D-type flip-flops 627, 629, 631, and 633, a calculator 635, a delay element or a D-type flip-flop 637, and a subtracter 639.

The input side of the delay element 602 is connected to the output side of the calculator 16 in the correlation circuit 44 (see FIG. 1). The output side of the delay element 602 is connected to the input side of the delay element 604. The output side of the delay element 602 is also connected to a first input side of the multiplier 608. Furthermore, the output side of the delay element 602 is connected to the input side of the calculator 625. The output side of the delay element 604 is connected to the input side of the delay element 606. The output side of the delay element 604 is also connected to a first input side of the multiplier 609. The output side of the delay element 606 is connected to a first input side of the multiplier 610. Second input sides of the multipliers 608, 609, and 610 are connected to the memory 611. The output side of the multiplier 608 is connected to a first input side of the adder 618. The output side of the multiplier 609 is connected to a second input side of the adder 618. The output side of the multiplier 610 is connected to a third input side of the adder 618. The output side of the adder 618 is connected to the input side of the calculator 620. The output side of the calculator 620 is connected to a first input side of the multiplier 622. A second input side of the multiplier 622 is connected to the memory 611. The output side of the multiplier 622 is connected to a first input side of the subtracter 639.

The output side of the calculator 625 is connected to the input side of the delay element 627. The output side of the delay element 627 is connected to the input side of the delay element 629. The output side of the delay element 627 is also connected to a first input side of the calculator 635. The output side of the delay element 629 is connected to the input side of the delay element 631. The output side of the delay element 631 is connected to the input side of the delay element 633. The output side of the delay element 633 is connected to a second input side of the calculator 635. The output side of the calculator 635 is connected to a second input side of the subtracter 639. The output side of the calculator 635 is also connected to the input side of the delay element 637. The output side of the delay element 637 is connected to a third input side of the calculator 635. Thus, the calculator 635 and the delay element 637 are combined to provide a feedback loop. The output side of the subtracter 639 is followed by the decision circuit 42F.

The delay elements 602, 604, and 606 compose a 3-stage shift register into which the output data from the calculator 16 in the correlation circuit 44 (see FIG. 1) is stored sample by sample. The output data from the calculator 16 is propagated through the 3-stage shift register while receiving a 1-sample delay by each of the delay elements 602, 604, and 606. The data outputted from the delay element 602 precedes the output data from the calculator 16 by a 1-sample time interval. The data outputted from the delay element 604 precedes the output data from the delay element 602 by a 1-sample time interval. Accordingly, the output data from the delay element 604 represents a computed correlation power corresponding to a sample immediately preceding a sample related to a computed correlation power represented by the output data from the delay element 602.

The data outputted from the delay element 606 precedes the data outputted from the delay element 602 by a 2-sample time interval. Accordingly, the output data from the delay element 606 represents a computed correlation power corresponding to a second immediately preceding sample with respect to a sample related to a computed correlation power represented by the output data from the delay element 602.

The memory 611 stores reference signals representing reference correlation powers for three successive samples (former, mid, and later samples). The reference correlation powers are predetermined to agree with computed correlation powers available in given good receiving conditions or given ideal receiving conditions.

The multiplier 608 receives the output data from the delay element 602. The multiplier 608 receives the reference signal from the memory 611 which represents the later-sample reference correlation power. The multiplier 608 calculates the product (the multiplication) between the computed correlation power represented by the output data from the delay element 602 and the later-sample reference correlation power. The multiplier 608 informs the adder 618 of the calculated later-sample product.

The multiplier 609 receives the output data from the delay element 604. The multiplier 609 receives the reference signal from the memory 611 which represents the mid-sample reference correlation power. The multiplier 609 calculates the product (the multiplication) between the computed correlation power represented by the output data from the delay element 604 and the mid-sample reference correlation power. The multiplier 609 informs the adder 618 of the calculated mid-sample product.

The multiplier 610 receives the output data from the delay element 606. The multiplier 610 receives the reference signal from the memory 611 which represents the former-sample reference correlation power. The multiplier 610 calculates the product (the multiplication) between the computed correlation power represented by the output data from the delay element 606 and the former-sample reference correlation power. The multiplier 610 informs the adder 618 of the calculated former-sample product.

The adder 618 calculates the sum of the later-sample product, the mid-sample product, and the former-sample product. The adder 618 informs the calculator 620 of the calculated product sum. The calculator 620 computes the square of the product sum. The calculator 620 informs the multiplier 622 of the computed square of the product sum.

The memory 611 stores a reference signal representing the reciprocal of the sum of the squares of the reference correlation powers for three successive samples. As previously described, the reference correlation power squares are predetermined to agree with computed correlation power squares available in given good receiving conditions or given ideal receiving conditions. The memory 611 informs the multiplier 622 of the reciprocal of the sum of the reference correlation power squares.

The multiplier 622 calculates the product (the multiplication) "Pt" between the product sum square represented by the output signal of the calculator 620 and the reciprocal of the sum of the reference correlation power squares which is represented by the output signal of the memory 611. The product "Pt" calculated by the multiplier 622 is expressed in the previously-indicated equation (13). The multiplier 622 outputs a signal representing the calculated product "Pt".

The calculator 625 receives the output data from the delay element 602. The calculator 625 computes the square of the computed correlation power represented by the output data from the delay element 602. The calculator 625 outputs data to the delay element 627 which represents the computed square of the correlation power.

The delay elements 627, 629, 631, and 633 compose a 4-stage shift register into which the output data from the calculator 625 is stored sample by sample. The output data from the calculator 625 is propagated through the 4-stage shift register while receiving a 1-sample delay by each of the delay elements 627, 629, 631, and 633. The data outputted from the delay element 627 precedes the output data from the calculator 625 by a 1-sample time interval. The data outputted from the delay element 633 precedes the data outputted from the delay element 627 by a 3-sample time interval. Accordingly, the output data from the delay element 633 represents a computed correlation power square corresponding to a third immediately preceding sample with respect to a sample related to a computed correlation power square represented by the output data from the delay element 627. The calculator 635 receives the output data from the delay element 627, the output data from the delay element 633, and the output data from the delay element 637. The calculator 635 computes the sum of the correlation power squares for three successive samples in response to the output data from the delay element 627, the output data from the delay element 633, and the output data from the delay element 637. The calculator 635 outputs data representing the computed sum of the correlation power squares. The output data from the calculator 635 is returned to the input side of the calculator 635 via the delay element 237 which provides a 1-sample delay. The calculator 635 subtracts the correlation power square, represented by the output signal of the delay element 633, from the immediately-preceding sum of the correlation power squares which is represented by the output signal of the delay element 637. The calculator 635 adds the correlation power square, represented by the output signal of the delay element 627, to the result of the previously-indicated subtraction. The result of this addition corresponds to the current sum of the correlation power squares for three successive samples. The calculator 635 outputs a signal representing the calculated sum of the correlation power squares.

The subtracter 639 receives the output signal of the multiplier 622 which represents the product "Pt". The subtracter 639 receives the output signal of the calculator 635 which represents the sum of the correlation power squares. The subtracter 639 subtracts the product "Pt" from the sum of the correlation power squares. The result of this subtraction corresponds to a synthetic error. For every sample interval, the subtracter 639 generates and outputs a data piece representing the synthetic error.

The delay elements 602, 604, and 606, the multipliers 608, 609, and 610, the memory 611, the adder 618, the calculator 620, the multiplier 622, the calculator 625, the delay elements 627, 629, 631, and 633, the calculator 635, the delay element 637, and the subtracter 639 in the error detection circuit 45F cooperate to calculate the synthetic error "e(t)" according to the previously indicated equation (14).

The decision circuit 42F follows the error detection circuit 45F. The input side of the decision circuit 42F is connected to the output side of the subtracter 639 in the error detection circuit 45F. For every sample interval, the decision circuit 42F receives the output data piece from the subtracter 639 which represents the synthetic error. The decision circuit 42F includes a comparator. For every sample interval, the comparator in the decision circuit 42F determines whether or not the synthetic error is greater than a predetermined threshold value. When the synthetic error is equal to or smaller than the threshold value, the decision circuit 42F outputs a signal of "1" as an indication of agreement between a symbol represented by a pair of the received in-phase signal and the received quadrature signal and the given symbol represented by a pair of the reference in-phase signal and the reference quadrature signal. On the other hand, when the synthetic error is greater than the threshold value, the decision circuit 42F outputs a signal of "0" as an indication of disagreement between a symbol represented by a pair of the received in-phase signal and the received quadrature signal and the given symbol represented by a pair of the reference in-phase signal and the reference quadrature signal.

The output signal of the decision circuit 42F is fed to a signal generator (not shown) for producing a symbol clock signal (a symbol timing signal). The signal generator controls the phase of the produced symbol clock signal in response to the output signal of the decision circuit 42F to synchronize the symbol clock signal with the received signal.

It should be noted that the error detection circuit 45F may be modified into a version having four or more stages. In this case, the error detection circuit 45F calculates the synthetic error "e(t)" according to the previously-indicated equations (15) and (16).

Eighth Embodiment

An eighth embodiment of this invention is similar to the embodiment of FIG. 1 except that a decision circuit 42G and an error detection circuit 45G replace the decision circuit 42 and the error detection circuit 45 in FIG. 1.

Figure 12:
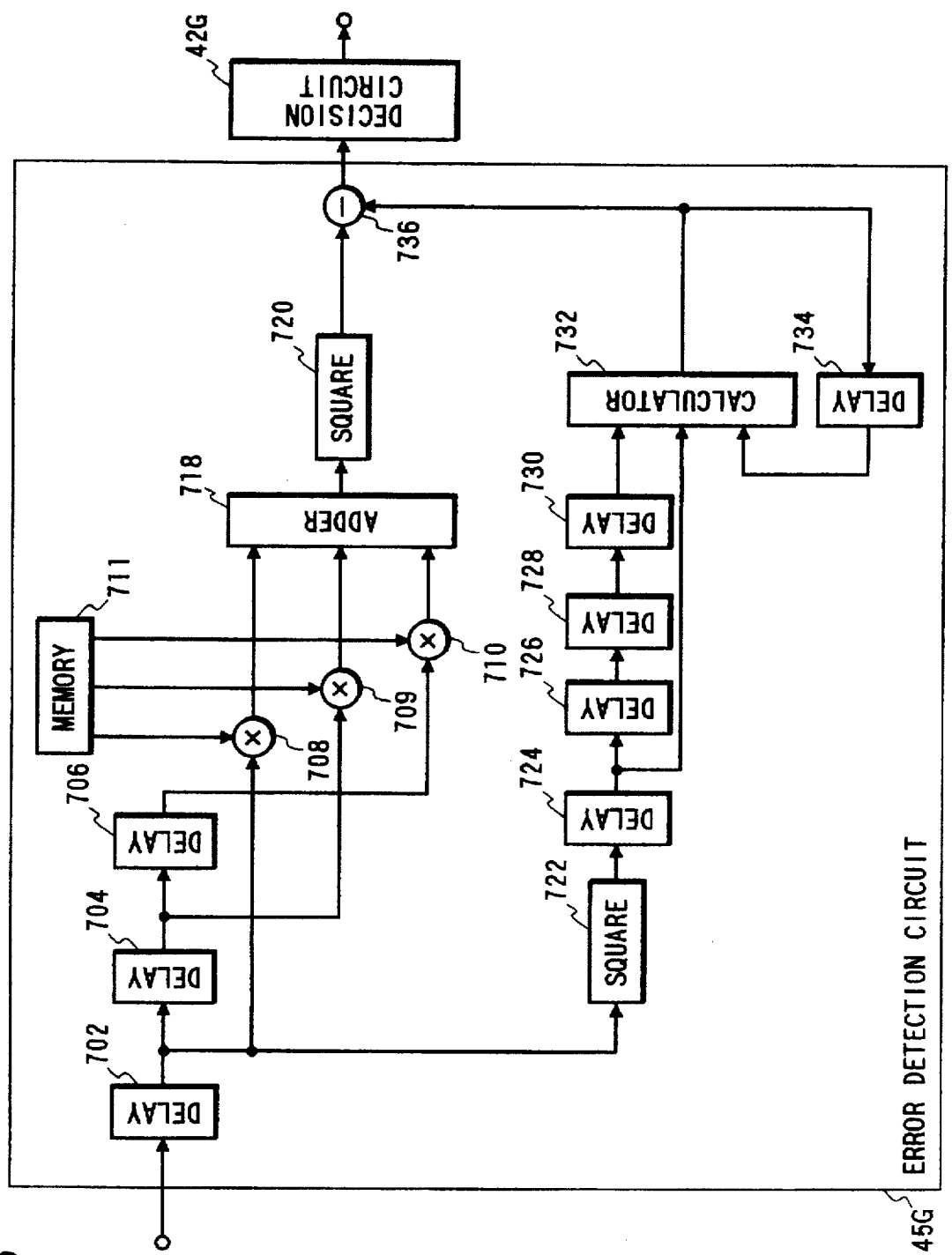
FIG. 12 is a block diagram of a part of a synchronization device according to an eighth embodiment of this invention.

As shown in FIG. 12, the error detection circuit 45G includes delay elements or D-type flip-flops 702, 704, and 706, multipliers 708, 709, and 710, a memory 711, an adder 718, calculators 720 and 722, delay elements or D-type flip-flops 724, 726, 728, and 730, a calculator 732, a delay element or a D-type flip-flop 734, and a subtracter 736.

The input side of the delay element 702 is connected to the output side of the calculator 16 in the correlation circuit 44 (see FIG. 1). The output side of the delay element 702 is connected to the input side of the delay element 704. The output side of the delay element 702 is also connected to a first input side of the multiplier 708. Furthermore, the output side of the delay element 702 is connected to the input side of the calculator 722. The output side of the delay element 704 is connected to the input side of the delay element 706. The output side of the delay element 704 is also connected to a first input side of the multiplier 709. The output side of the delay element 706 is connected to a first input side of the multiplier 710. Second input sides of the multipliers 708, 709, and 710 are connected to the memory 711. The output side of the multiplier 708 is connected to a first input side of the adder 718. The output side of the multiplier 709 is connected to a second input side of the adder 718. The output side of the multiplier 710 is connected to a third input side of the adder 718. The output side of the adder 718 is connected to the input side of the calculator 720. The output side of the calculator 720 is connected to a first input side of the subtracter 736.

The output side of the calculator 722 is connected to the input side of the delay element 724. The output side of the delay element 724 is connected to the input side of the delay element 726. The output side of the delay element 724 is also connected to a first input side of the calculator 732. The output side of the delay element 726 is connected to the input side of the delay element 728. The output side of the delay element 728 is connected to the input side of the delay element 730. The output side of the delay element 730 is connected to a second input side of the calculator 732. The output side of the calculator 732 is connected to a second input side of the subtracter 736. The output side of the calculator 732 is also connected to the input side of the delay element 734. The output side of the delay element 734 is connected to a third input side of the calculator 732. Thus, the calculator 732 and the delay element 734 are combined to provide a feedback loop. The output side of the subtracter 736 is followed by the decision circuit 42G.

The delay elements 702, 704, and 706 compose a 3-stage shift register into which the output data from the calculator 16 in the correlation circuit 44 (see FIG. 1) is stored sample by sample. The output data from the calculator 16 is propagated through the 3-stage shift register while receiving a 1-sample delay by each of the delay elements 702, 704, and 706. The data outputted from the delay element 702 precedes the output data from the calculator 16 by a 1-sample time interval. The data outputted from the delay element 704 precedes the output data from the delay element 702 by a 1-sample time interval. Accordingly, the output data from the delay element 704 represents a computed correlation power corresponding to a sample immediately preceding a sample related to a computed correlation power represented by the output data from the delay element 702. The data outputted from the delay element 706 precedes the data outputted from the delay element 702 by a 2-sample time interval. Accordingly, the output data from the delay element 706 represents a computed correlation power corresponding to a second immediately preceding sample with respect to a sample related to a computed correlation power represented by the output data from the delay element 702.

The memory 711 stores reference signals representing reference correlation powers for three successive samples (former, mid, and later samples). The reference correlation powers are predetermined to agree with computed correlation powers available in given good receiving conditions or given ideal receiving conditions.

The multiplier 708 receives the output data from the delay element 702. The multiplier 708 receives the reference signal from the memory 711 which represents the later-sample reference correlation power. The multiplier 508 calculates the product (the multiplication) between the computed correlation power represented by the output data from the delay element 702 and the later-sample reference correlation power. The multiplier 708 informs the adder 718 of the calculated later-sample product.

The multiplier 709 receives the output data from the delay element 704. The multiplier 709 receives the reference signal from the memory 711 which represents the mid-sample reference correlation power. The multiplier 709 calculates the product (the multiplication) between the computed correlation power represented by the output data from the delay element 704 and the mid-sample reference correlation power. The multiplier 709 informs the adder 718 of the calculated mid-sample product.

The multiplier 710 receives the output data from the delay element 706. The multiplier 710 receives the reference signal from the memory 711 which represents the former-sample reference correlation power. The multiplier 710 calculates the product (the multiplication) between the computed correlation power represented by the output data from the delay element 706 and the former-sample reference correlation power. The multiplier 710 informs the adder 718 of the calculated former-sample product.

The adder 718 calculates the sum of the later-sample product, the mid-sample product, and the former-sample product. The adder 718 informs the calculator 720 of the calculated product sum. The calculator 720 computes the square of the product sum. The calculator 720 outputs a signal representing the computed square of the product sum.

The calculator 722 receives the output data from the delay element 702. The calculator 722 computes the square of the computed correlation power represented by the output data from the delay element 702. The calculator 722 outputs data to the delay element 724 which represents the computed square of the correlation power.

The delay elements 724, 726, 728, and 730 compose a 4-stage shift register into which the output data from the calculator 722 is stored sample by sample. The output data from the calculator 722 is propagated through the 4-stage shift register while receiving a 1-sample delay by each of the delay elements 724, 726, 728, and 730. The data outputted from the delay element 724 precedes the output data from the calculator 722 by a 1-sample time interval. The data outputted from the delay element 730 precedes the data outputted from the delay element 724 by a 3-sample time interval. Accordingly, the output data from the delay element 730 represents a computed correlation power square corresponding to a third immediately preceding sample with respect to a sample related to a computed correlation power square represented by the output data from the delay element 724. The calculator 732 receives the output data from the delay element 724, the output data from the delay element 730, and the output data from the delay element 734. The calculator 732 computes the sum of the correlation power squares for three successive samples in response to the output data from the delay element 724, the output data from the delay element 730, and the output data from the delay element 734. The calculator 732 outputs data representing the computed sum of the correlation power squares. The output data from the calculator 732 is returned to the input side of the calculator 732 via the delay element 734 which provides a 1-sample delay. The calculator 732 subtracts the correlation power square, represented by the output signal of the delay element 730, from the immediately-preceding sum of the correlation power squares which is represented by the output signal of the delay element 734. The calculator 732 adds the correlation power square, represented by the output signal of the delay element 724, to the result of the previously-indicated subtraction. The result of this addition corresponds to the current sum of the correlation power squares for three successive samples. The calculator 732 outputs a signal representing the calculated sum of the correlation power squares.

The subtracter 736 receives the output signal of the calculator 720 which represents the square of the product sum. The subtracter 736 receives the output signal of the calculator 732 which represents the sum of the correlation power squares. The subtracter 736 subtracts the square of the product sum from the sum of the correlation power squares. The result of this subtraction corresponds to a synthetic error. For every sample interval, the subtracter 736 generates and outputs a data piece representing the synthetic error.

The delay elements 702, 704, and 706, the multipliers 708, 709, and 710, the memory 711, the adder 718, the calculators 720 and 722, the delay elements 724, 726, 728, and 730, the calculator 732, the delay element 734, and the subtracter 736 in the error detection circuit 45G cooperate to calculate the synthetic error "e(t)" according to the previously-indicated equations (17), (18), and (19).

The decision circuit 42G follows the error detection circuit 45G. The input side of the decision circuit 42G is connected to the output side of the subtracter 736 in the error detection circuit 45G. For every sample interval, the decision circuit 42G receives the output data piece from the subtracter 736 which represents the synthetic error. The decision circuit 42G includes a comparator. For every sample interval, the comparator in the decision circuit 42G determines whether or not the synthetic error is greater than a predetermined threshold value. When the synthetic error is equal to or smaller than the threshold value, the decision circuit 42G outputs a signal of "1" as an indication of agreement between a symbol represented by a pair of the received in-phase signal and the received quadrature signal and the given symbol represented by a pair of the reference in-phase signal and the reference quadrature signal. On the other hand, when the synthetic error is greater than the threshold value, the decision circuit 42G outputs a signal of "0" as an indication of disagreement between a symbol represented by a pair of the received in-phase signal and the received quadrature signal and the given symbol represented by a pair of the reference in-phase signal and the reference quadrature signal.

The output signal of the decision circuit 42G is fed to a signal generator (not shown) for producing a symbol clock signal (a symbol timing signal). The signal generator controls the phase of the produced symbol clock signal in response to the output signal of the decision circuit 42G to synchronize the symbol clock signal with the received signal.

It should be noted that the error detection circuit 45G may be modified into a version having four or more stages. In this case, the error detection circuit 45G calculates the synthetic error "e(t)" according to the previously-indicated equations (20), (21), and (22).

What is claimed is:

1. A synchronization device comprising:
    first means for generating a predetermined signal;
    second means for detecting a correlation between a received signal and the predetermined signal generated by the first means;
    third means for generating a predetermined correlation reference for a given number of successive samples, the given number being equal to at least three;
    fourth means for calculating an error e(t) between the correlation detected by the second means and the predetermined correlation reference generated by the third means for the given number of successive samples as follows:

$$e(t) = \sum_{n=0}^{N-1} \{x(t+nT) - y(n)\}^2$$

where "n" denotes an integer corresponding to each of "N" successive samples; "t" denotes a time point; "N" denotes the given number; "T" denotes a 1-sample time interval; "x(t+nT)" denotes the correlation detected by the second means; and "Y(n)" denotes the predetermined correlation reference; and
    fifth means for comparing the error calculated by the fourth means with a predetermined threshold value to detect a synchronization timing.

2. A synchronization device as recited in claim 2, wherein the fourth means comprises:
    first, second, and third delay elements each for providing a 1-sample delay, the first delay element receiving an output signal of the second means which represents the detected correlation, the first delay element being successively followed by the second and third delay elements;
    a first subtracter calculating a first difference between an output signal of the first delay element and the predetermined correlation reference "y(0)";
    a second subtracter calculating a second difference between an output signal of the second delay element and the predetermined correlation reference "y(1)";
    a third subtracter calculating a third difference between an output signal of the third delay element and the predetermined correlation reference "y(2)";
    a first calculator calculating a square of the first difference calculated by the first subtracter;
    a second calculator calculating a square of the second difference calculated by the second subtracter;
    a third calculator calculating a square of the third difference calculated by the third subtracter; and
    an adder adding the square calculated by the first calculator, the square calculated by the second calculator, and the square calculated by the third calculator into the error "e(t)".

3. A synchronization device as recited in claim 1, wherein the fourth means comprises:
    first, second, and third delay elements each for providing a 1-sample delay, the first delay element receiving an output signal of the second means which represents the detected correlation, the first delay element being successively followed by the second and third delay elements;
    a first multiplier multiplying an output signal of the first delay element and the predetermined correlation reference "y(0)";
    a second multiplier multiplying an output signal of the second delay element and the predetermined correlation reference "y(1)";
    a third multiplier multiplying an output signal of the third delay element and the predetermined correlation reference "y(2)";
    a first adder adding output signals of the first, second, and third multipliers;
    a first calculator doubles an output signal of the first adder;
    a second calculator squaring the output signal of the first delay element;
    fourth, fifth, and sixth delay elements each for providing a 1-sample delay, the fourth delay element receiving an output signal of the second calculator, the fourth delay element being successively followed by the fifth and sixth delay elements;
    a second adder adding output signals of the fourth, fifth, and sixth delay elements; and
    a third calculator subtracting an output signal of the first calculator from an output signal of the second adder, and adding a result of said subtracting and a sum of a square of the predetermined correlation reference "y(0)", a square of the predetermined correlation reference "y(1)", and a square of the predetermined correlation reference "y(2)" to calculate the error "e(t)".

4. A synchronization device as recited in claim 1, wherein the fourth means comprises:

first, second, and third delay elements each for providing a 1-sample delay, the first delay element receiving an output signal of the second means which represents the detected correlation, the first delay element being successively followed by the second and third delay elements;

a first multiplier multiplying an output signal of the first delay element and the predetermined correlation reference "y(0)";

a second multiplier multiplying an output signal of the second delay element and the predetermined correlation reference "y(1)";

a third multiplier multiplying an output signal of the third delay element and the predetermined correlation reference "y(2)";

an adder adding output signals of the first, second, and third multipliers;

a first calculator doubles an output signal of the adder;

a second calculator squaring the output signal of the first delay element;

fourth, fifth, sixth, and seventh delay elements each for providing a 1-sample delay, the fourth delay element receiving an output signal of the second calculator, the fourth delay element being successively followed by the fifth, sixth, and seventh delay elements;

an eighth delay element for proving a 1-sample delay;

a third calculator subtracting an output signal of the seventh delay element from an output signal of the fourth delay element, and adding a result of said subtracting and an output signal of the eighth delay element, an output signal of the third calculator being fed to the eighth delay element; and a fourth calculator subtracting an output signal of the first calculator from the output signal of the third calculator, and adding a result of said subtracting and a sum of a square of the predetermined correlation reference "y(0)", a square of the predetermined correlation reference "y(1)", and a square of the predetermined correlation reference "y(2)" to calculate the error "e(t)".

5. A synchronization device comprising:

first means for generating a predetermined signal;

second means for detecting a correlation between a received signal and the predetermined signal generated by the first means;

third means for generating a predetermined correlation reference for a given number of successive samples, the given number being equal to at least three;

fourth means for determining a corrective factor in response to the correlation detected by the second means and the predetermined correlation reference generated by the third means;

fifth means for correcting the predetermined correlation reference generated by the third means into a second correlation reference in response to the corrective factor determined by the fourth means;

sixth means for calculating an error e(t) between the correlation detected by the second means and the second correlation reference generated by the fifth means for the given number of successive samples as follows:

$$e(t) = \sum_{n=0}^{N-1} \{x(t+nT) - ay(n)\}^2$$

$$a = \left[ \sum_{n=0}^{N-1} x(t+nT)y(n) \right] / \left[ \sum_{n=0}^{N-1} y(n)^2 \right]$$

where "n" denotes an integer corresponding to each of "N" successive samples; "t" denotes a time point; "N" denotes the given number; "T" denotes a 1-sample time interval; "x(t+nT)" denotes the correlation detected by the second means; "Y(n)" denotes the predetermined correlation reference; and "a" denotes the corrective factor determined by the fourth means; and seventh means for comparing the error calculated by the sixth means with a predetermined threshold value to detect a synchronization timing.

6. A synchronization device as recited in claim 5, wherein the fourth means, the fifth means, and the sixth means comprise:

first, second, and third delay elements each for providing a 1-sample delay, the first delay element receiving an output signal of the second means which represents the detected correlation, the first delay element being successively followed by the second and third delay elements;

a first multiplier multiplying an output signal of the first delay element and the predetermined correlation reference "y(0)";

a second multiplier multiplying an output signal of the second delay element and the predetermined correlation reference "y(1)";

a third multiplier multiplying an output signal of the third delay element and the predetermined correlation reference "y(2)";

a first adder adding output signals of the first, second, and third multipliers;

a fourth multiplier multiplying an output signal of the first adder and a reciprocal of a sum of a square of the predetermined correlation reference "y(0)", a square of the predetermined correlation reference "y(1)", and a square of the predetermined correlation reference "y(2)";

a fifth multiplier multiplying the predetermined correlation reference "y(0)" and an output signal of the fourth multiplier;

a sixth multiplier multiplying the predetermined correlation reference "y(1)" and the output signal of the fourth multiplier;

a seventh multiplier multiplying the predetermined correlation reference "y(2)" and the output signal of the fourth multiplier;

a first subtracter calculating a first difference between the output signal of the first delay element and an output signal of the fifth multiplier;

a second subtracter calculating a second difference between the output signal of the second delay element and an output signal of the sixth multiplier;

a third subtracter calculating a third difference between the output signal of the third delay element and an output signal of the seventh multiplier;

a first calculator calculating a square of the first difference calculated by the first subtracter;

a second calculator calculating a square of the second difference calculated by the second subtracter;

a third calculator calculating a square of the third difference calculated by the third subtracter; and a second adder adding the square calculated by the first calculator, the square calculated by the second calculator, and the square calculated by the third calculator into the error "e(t)".

7. A synchronization device comprising:

first means for generating a predetermined signal;

second means for detecting a correlation between a received signal and the predetermined signal generated by the first means;

third means for generating predetermined correlation references "y(0)", "y(1)", and "y(2)" for three successive samples respectively;

first, second, and third delay elements each for providing a 1-sample delay, the first delay element receiving an output signal of the second means which represent the detected correlation, the first delay element being successively followed by the second and third delay elements;

a first multiplier multiplying an output signal of the first delay element and the predetermined correlation reference "y(0)";

a second multiplier multiplying an output signal of the second delay element and the predetermined correlation reference "y(1)";

a third multiplier multiplying an output signal of the third delay element and the predetermined correlation reference "y(2)";

a first adder adding output signals of the first, second, and third multipliers;

a first calculator squaring an output signal of the first adder;

a fourth multiplier multiplying an output signal of the first calculator and a reciprocal of a sum of a square of the predetermined correlation reference "y(0)", a square of the predetermined correlation reference "y(1)", and a square of the predetermined correlation reference "y(2)";

a second calculator squaring the output signal of the first delay element;

fourth, fifth, and sixth delay elements each for providing a 1-sample delay, the fourth delay element receiving an output signal of the second calculator, the fourth delay element being successively followed by the fifth and sixth delay elements;

a second adder adding output signals of the fourth, fifth, and sixth delay elements;

a subtracter calculating a difference between an output signal of the fourth multiplier and an output signal of the second adder; and fourth means for comparing the difference calculated by the subtracter with a predetermined threshold value to detect a synchronization timing.

8. A synchronization device comprising:

first means for generating predetermined signal;

second means for detecting a correlation between a received signal and the predetermined signal generated by the first means;

third means for generating predetermined correlation references "y(0)", "y(1)", and "y(2)" for three successive samples respectively;

first, second and third delay elements each for providing a 1-sample delay, the first delay element receiving an output signal of the second means which represent the detected correlation, the first delay element being successively followed by the second and third delay elements;

a first multiplier multiplying an output signal of the first delay element and the predetermined correlation reference "y(0)";

a second multiplier multiplying an output signal of the second delay element and the predetermined correlation reference "y(1)";

a third multiplier multiplying an output signal of the third delay element and the predetermined correlation reference "y(2)";

a first adder adding output signals of the first, second, and third multipliers;

a first calculator squaring an output signal of the first adder;

a second calculator squaring the output signal of the first delay element;

fourth, fifth, and sixth delay elements each for providing a 1-sample delay, the fourth delay element receiving an output signal of the second calculator, the fourth delay element being successively followed by the fifth and sixth delay elements;

a second adder adding output signals of the fourth, fifth, and sixth delay elements;

a subtracter calculating a difference between an output signal of the first calculator and an output signal of the second adder; and fourth means for comparing the difference calculated by the subtracter with a predetermined threshold value to detect a synchronization timing.

9. A synchronization device comprising:

first means for generating a predetermined signal;

second means for detecting a correlation between a received signal and the predetermined signal generated by the first means;

third means for generating predetermined correlation references "y(0)", "y(1)", and "y(2)" for three successive samples respectively;

first, second, and third delay elements each for providing a 1-sample delay, the first delay element receiving an output signal of the second means which represents the detected correlation, the first delay element being successively followed by the second and third delay elements;

a first multiplier multiplying an output signal of the first delay element and the predetermined correlation reference "y(0)";

a second multiplier multiplying an output signal of the second delay element and the predetermined correlation reference "y(1)";

a third multiplier multiplying an output signal of the third delay element and the predetermined correlation reference "y(2)";

an adder adding output signals of the first, second, and third multipliers;

a first calculator squaring an output signal of the adder;

a fourth multiplier multiplying an output signal of the first calculator and a reciprocal of a sum of a square of the predetermined correlation reference "y(0)", a square of the predetermined correlation reference "y(1)", and a square of the predetermined correlation reference "y(2)";

a second calculator squaring the output signal of the first delay element;

fourth, fifth, sixth, and seventh delay elements each for providing a 1-sample delay, the fourth delay element being successively followed by the fifth, sixth, and seventh delay elements;

an eighth delay element for providing a 1-sample delay;

a third calculator subtracting an output signal of the seventh delay element from an output signal of the fourth delay element, and adding a result of said subtracting and an output signal of the eighth delay element, an output signal of the third calculator being fed to the eighth delay element;

a subtracter calculating a difference between an output signal of the fourth multiplier and the output signal of the third calculator; and fourth means for comparing the difference calculated by the subtracter with a predetermined threshold value to detect a synchronization timing.

10. A synchronization device comprising:

first means for generating a predetermined signal;

second means for detecting a correlation between a received signal and the predetermined signal generated by the first means;

third means for generating predetermined correlation references "y(0)", "y(1)", and "y(2)" for three successive samples respectively;

first, second, and third delay elements each for providing a 1-sample delay, the first delay element receiving an output signal of the second means which represents the detected correlation, the first delay element being successively followed by the second and third delay elements;

a first multiplier multiplying an output signal of the first delay element and the predetermined correlation reference "y(0)";

a second multiplier multiplying an output signal of the second delay element and the predetermined correlation reference "y(1)";

a third multiplier multiplying an output signal of the third delay element and the predetermined correlation reference "y(2)";

an adder adding output signals of the first, second, and third multipliers;

a first calculator squaring an output signal of the adder;

a second calculator squaring the output signal of the first delay element;

fourth, fifth, sixth, and seventh delay elements each for providing a 1-sample delay, the fourth delay element receiving an output signal of the second calculator, the fourth delay element being successively followed by the fifth, sixth, and seventh delay elements;

an eighth delay element for providing a 1-sample delay;

a third calculator subtracting an output signal of the seventh delay element from an output signal of the fourth delay element, and adding a result of said subtracting and an output signal of the eighth delay element, and output signal of the third calculator being fed to the eighth delay element;

a subtracter calculating a difference between an output signal of the first calculator and the output signal of the third calculator; and fourth means for comparing the difference calculated by the subtracter with a predetermined threshold value to detect a synchronization timing.

\* \* \* \* \*